US010970083B2

(12) United States Patent
Drummond et al.

(10) Patent No.: US 10,970,083 B2
(45) Date of Patent: *Apr. 6, 2021

(54) LOG IN/LOG OUT PROCESS FOR EDU MODE

(71) Applicant: Apple Inc., Cupertino, CA (US)

(72) Inventors: Jonathan E. Drummond, Sunnyvale, CA (US); Anthony R. Griffin, San Jose, CA (US); Andrew B. Cato, Sunnyvale, CA (US); Benjamin E. Nielsen, Sunnyvale, CA (US); Daniel T. Kurtz, Sunnyvale, CA (US); David Steinberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/259,730

(22) Filed: Jan. 28, 2019

(65) Prior Publication Data
US 2019/0228158 A1    Jul. 25, 2019

Related U.S. Application Data

(63) Continuation of application No. 14/991,968, filed on Jan. 10, 2016, now Pat. No. 10,192,055.

(51) Int. Cl.
*G06F 9/00* (2006.01)
*G06F 9/4401* (2018.01)
(Continued)

(52) U.S. Cl.
CPC .......... *G06F 9/4406* (2013.01); *G06F 9/4416* (2013.01); *G06F 21/31* (2013.01);
(Continued)

(58) Field of Classification Search
CPC ...... G06F 21/575; G06F 21/31; G06F 9/4416; G06F 9/4406; G06F 21/6218;
(Continued)

(56) References Cited

U.S. PATENT DOCUMENTS 5,825,649 A * 10/1998 Yoshimura ............ G06F 9/4856 700/82
7,269,722 B1 * 9/2007 Neary ................... G06F 9/4401 703/22

(Continued)

OTHER PUBLICATIONS

Two people one tablet (Year: 2013).*
Two people one tablet what are your options? [android] by Chris Hoffman (Year: 2013).

*Primary Examiner* — Volvick Derose
(74) *Attorney, Agent, or Firm* — Womble Bond Dickinson (US) LLP

(57) ABSTRACT

Systems and methods are disclosed for implementing an educational mode on a portable computing device, such as a tablet computer, that is a single-user system, used serially by multiple users. Each user can have a separate user storage that may be encrypted. The computing device boots as a system user to a login screen. A first student user enters user credentials into the login screen. The computing device can reboot the user-space processes, while leaving the kernel running, rebooting the computing device as the first student user. When the first student user logs out, data to be synchronized to, e.g., the cloud, can be synchronized for the first student user while a second student user is logged into the device.

20 Claims, 16 Drawing Sheets

(51) Int. Cl.
*G06F 21/57* (2013.01)
*H04L 29/06* (2006.01)
*G06F 21/62* (2013.01)
*H04L 29/08* (2006.01)
*H04W 4/12* (2009.01)
*H04L 9/08* (2006.01)
*H04L 9/32* (2006.01)
*H04W 12/08* (2021.01)
*G06F 21/31* (2013.01)
*H04W 12/041* (2021.01)

(52) U.S. Cl.
CPC ........ *G06F 21/575* (2013.01); *G06F 21/6218* (2013.01); *H04L 9/0863* (2013.01); *H04L 9/3226* (2013.01); *H04L 63/0428* (2013.01); *H04L 63/06* (2013.01); *H04L 63/0876* (2013.01); *H04L 67/02* (2013.01); *H04L 67/04* (2013.01); *H04L 67/104* (2013.01); *H04L 67/1095* (2013.01); *H04L 67/1097* (2013.01); *H04L 67/42* (2013.01); *H04W 4/12* (2013.01); *H04W 12/041* (2021.01); *H04W 12/08* (2013.01); *G06F 9/4401* (2013.01); *G06F 9/4403* (2013.01); *G06F 2221/2149* (2013.01)

(58) Field of Classification Search
CPC .......... G06F 2221/2149; G06F 9/4401; H04L 67/04; H04L 67/1097; H04L 67/42; H04L 67/1095; H04L 63/0428; H04L 9/3226; H04L 9/0863; H04L 67/104; H04L 67/02; H04L 63/06; H04L 63/0876; H04W 12/08; H04W 12/04; H04W 4/12
USPC ........................................................... 713/2
See application file for complete search history.

(56) References Cited

U.S. PATENT DOCUMENTS

| | | | | |
|---|---|---|---|---|
| 9,891,839 | B2* | 2/2018 | Thelen | G06F 9/544 |
| 2002/0023211 | A1* | 2/2002 | Roth | G06F 9/44505 |
| | | | | 713/164 |
| 2005/0081212 | A1* | 4/2005 | Goud | G06F 9/45558 |
| | | | | 718/107 |
| 2006/0075299 | A1* | 4/2006 | Chandramouleeswaran | |
| | | | | G06F 11/1441 |
| | | | | 714/38.11 |
| 2007/0061587 | A1* | 3/2007 | Kim | G06F 21/575 |
| | | | | 713/182 |
| 2007/0134068 | A1* | 6/2007 | Smith | G06F 9/4401 |
| | | | | 406/39 |
| 2009/0037718 | A1* | 2/2009 | Ganesh | G06F 9/5077 |
| | | | | 713/2 |
| 2010/0075641 | A1* | 3/2010 | Schwartz | H04L 51/38 |
| | | | | 455/414.1 |
| 2010/0083254 | A1* | 4/2010 | Takahashi | G06F 9/4843 |
| | | | | 718/100 |
| 2010/0180066 | A1* | 7/2010 | Powell | G06F 12/0875 |
| | | | | 711/103 |
| 2011/0113326 | A1* | 5/2011 | Baer | G06F 40/194 |
| | | | | 715/255 |
| 2011/0296164 | A1* | 12/2011 | Boebert | G06F 21/604 |
| | | | | 713/150 |
| 2012/0005445 | A1* | 1/2012 | Escandell | G06F 12/023 |
| | | | | 711/170 |
| 2013/0024917 | A1* | 1/2013 | Han | G06Q 10/10 |
| | | | | 726/5 |
| 2013/0160141 | A1* | 6/2013 | Tseng | G06F 21/31 |
| | | | | 726/28 |
| 2014/0082717 | A1* | 3/2014 | Kang | G06F 21/53 |
| | | | | 726/9 |
| 2014/0189816 | A1* | 7/2014 | Halperin | H04L 63/10 |
| | | | | 726/4 |
| 2014/0289864 | A1* | 9/2014 | Dimitrakos | G06F 21/572 |
| | | | | 726/26 |
| 2014/0340411 | A1* | 11/2014 | Costa | G06F 9/4411 |
| | | | | 345/505 |
| 2014/0380313 | A1* | 12/2014 | Chen | G06F 9/4416 |
| | | | | 718/1 |
| 2015/0089105 | A1* | 3/2015 | Lu | G06F 13/24 |
| | | | | 710/269 |
| 2015/0178097 | A1* | 6/2015 | Russinovich | G06F 9/4418 |
| | | | | 713/2 |
| 2015/0178168 | A1* | 6/2015 | Dunshea | G06F 11/0787 |
| | | | | 714/20 |
| 2015/0215398 | A1* | 7/2015 | Chang | G06F 16/957 |
| | | | | 726/8 |
| 2015/0235037 | A1* | 8/2015 | Schentrup | H04L 63/104 |
| | | | | 726/28 |
| 2015/0288840 | A1* | 10/2015 | Ge | H04N 1/00875 |
| | | | | 358/1.14 |
| 2015/0334217 | A1* | 11/2015 | Braden | G06F 21/62 |
| | | | | 455/411 |
| 2017/0200008 | A1 | 7/2017 | Wright et al. | |

* cited by examiner

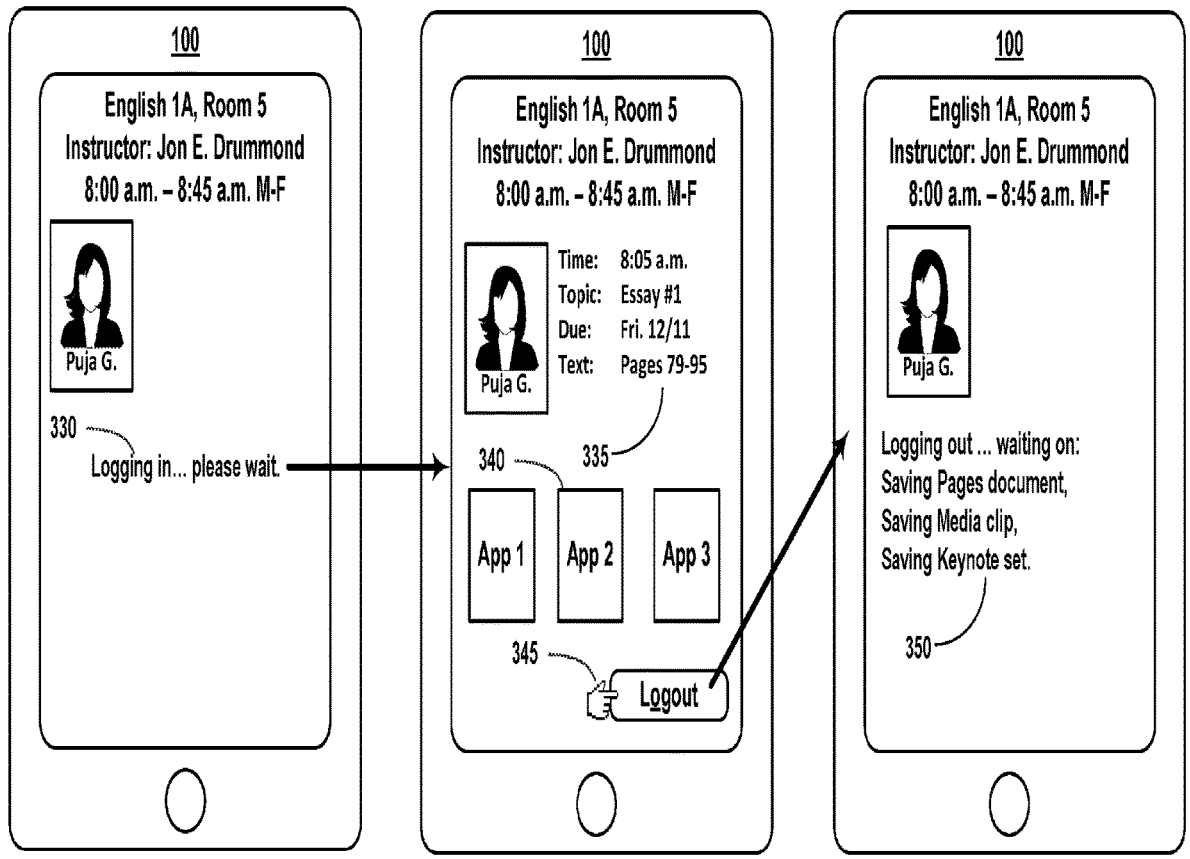
*FIG. 3D*      *FIG. 3E*      *FIG. 3F*

LOG IN/LOG OUT PROCESS FOR EDU MODE

This application is a continuation of co-pending U.S. application Ser. No. 14/991,968 filed on Jan. 10, 2016, which application is incorporated herein by reference in us entirety.

TECHNICAL FIELD

This disclosure relates to the fields of multiple, single users utilizing a computing device.

BACKGROUND

Modern classrooms utilize tablet computers as teaching tools in the classroom. Many schools will purchase a single tablet computer for each seat in a classroom, rather than requiring each student to purchase her own tablet computer. When a class begins, each student in the class will log in to the tablet device at her seat in the classroom. When a class ends, students will all log out, saving their work to disk and/or synchronizing their work to cloud storage. The students will then leave the tablet computer at their respective seats in the classroom. When the next class in the classroom begins, each student of the next class will log in to use the tablet computer at her respective seat in the classroom.

When a class ends, the saving to disk and/or synchronizing to cloud storage of the work of all students in the classroom can cause a spike in classroom network usage that slows down the network and saving process. Further, student work, or classwork, such as animations, graphics, video, and other data can be very large, both on a per student basis and on a total for the classroom basis, further delaying the saving of the student data for a class. A tablet computer typically does not have sufficient computing resources to allow a previous student's computing processes to complete and to defer logout of the previous student, while simultaneously allowing a subsequent student to tog in and begin work on the same tablet computer. Also, current tablet computers do not offer per-user data encryption on the tablet computer.

SUMMARY OF THE DESCRIPTION

Systems and methods are disclosed for implementing an educational mode on a portable computing device, such as a tablet computer, that is a single-user system, used serially by multiple users. Each user can have a separate user storage that may be encrypted. The computing device boots as a system user to a login screen. A first student user can enter their user credentials into the login screen. The computing device can reboot the user-space processes, while leaving the kernel running, rebooting the computing device as the first student user. When the first student user logs out, data to be synchronized to, e.g., the cloud or local network storage, can be synchronized for the first student user while a second student user is logged into the device. In an embodiment, data to be synchronized to, e.g. the cloud or local network storage, can be synchronized for the first user while the computing device is booted to the login screen as the system user. Management of the boot and reboot processes can be performed by a user manager daemon.

A synchronization manifest can include a synchronization task for each data source for a first student user. A synchronization task can include information that enables a synchronization daemon to access the data to be synchronized, and obtain an access key or keys to the service that will be used in the synchronization. The synchronization manifest can be persisted across users such that when a second student user logs in, the synchronization manifest of the first user can be processed to synchronize the first user's data while the second student user utilizes the device. The synchronization manifest for a first user can be stored in system storage, the client device user-space can be rebooted to a second user, then the tasks in the manifest of the first user can be performed while the second user performs her work. In an embodiment, the manifest tasks of the first user are performed in the background of user-space, while the work of the second user is performed in the foreground of user-space.

In another embodiment a non-transitory computer readable can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with Other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 3A through 3F illustrate a example displays of a method of logging in and logging out of users of a client system in an educational computing environment, according to some embodiments.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
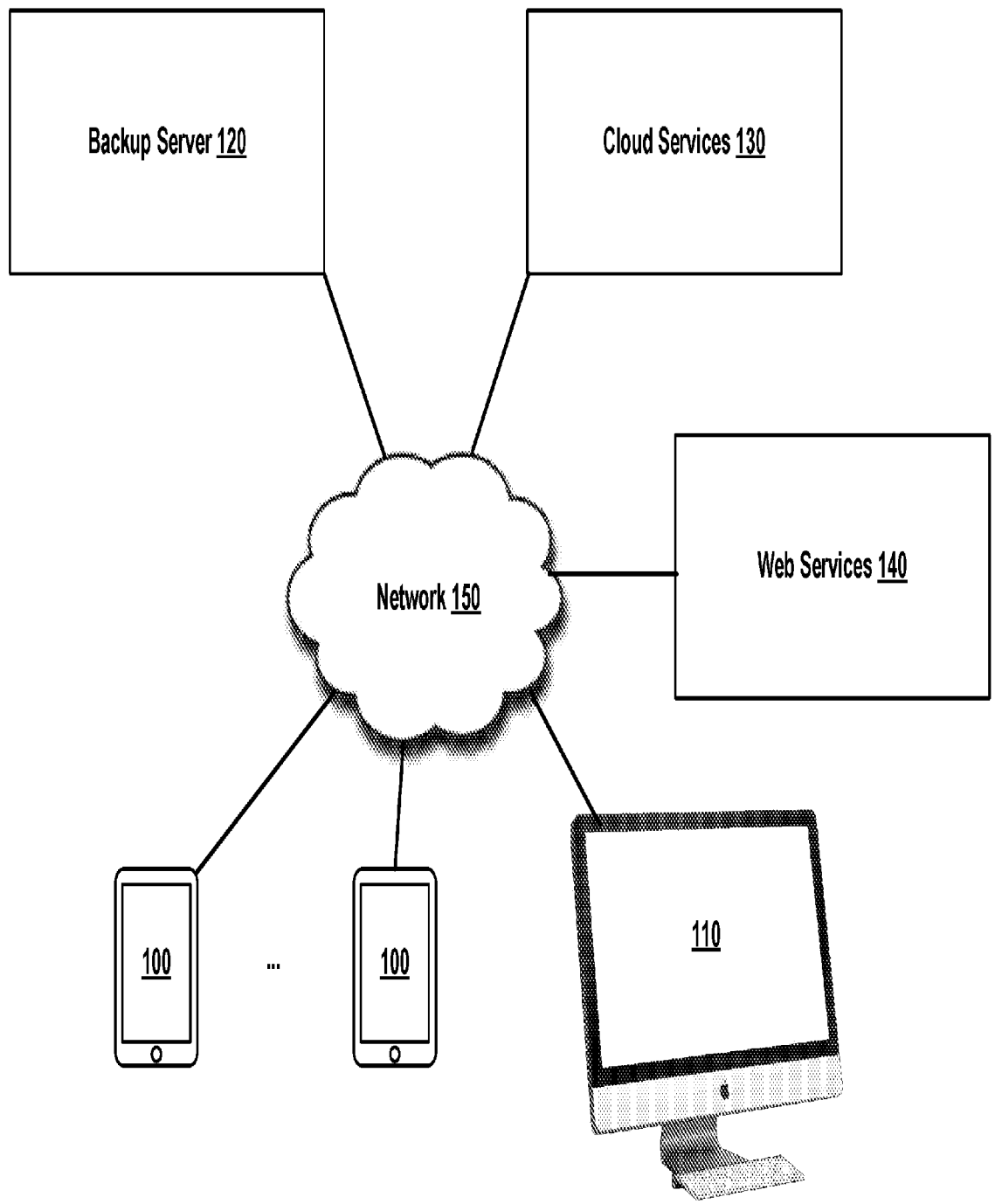
FIG. 1 illustrates, in block form, an educational computing environment according to some embodiments.

FIG. 1 illustrates, in block form, an educational computing environment according to some embodiments. An educational computing environment can include a plurality of client computing devices ("client devices") 100, a teacher workstation 110, one or more backup server(s) 120 and one or more cloud service(s) 130, and one or more web service(s) 140, communicatively coupled via network 150.

Network 150 can be any type of network, such as Ethernet, Token Ring, FireWire, USB, Fibre Channel, or other network type.

A client device 100 can be any computing device, such as described with reference to FIG. 12, below. A client device 100 can be a tablet computer, such as the Apple® iPad®. Tablet computers are configured to be operated by one student at a time. Multiple different students may serially use the same tablet computer 100 over multiple classroom sessions. Each student can generate substantial amounts of data that, at the end of a classroom session, may need to be synchronized with one or more cloud services 130, stored to one or more backup server(s) 120, or synchronized with one or more web service(s) 140 (collectively, "synch'd up"). Student user data can also be stored on the client device 100. In an embodiment, the student user data stored for different students on the same client device 100 can be encrypted on a per-student basis. In an embodiment, encryption of student data on client device 100 can be formed using login credentials (a "passcode") as a portion of the encryption key. In an embodiment, an encryption key that encrypts a student user's data can be derived from the student user's passcode.

Client devices 100 can be provisioned to support an educational ("EDU") mode of operation. Such provisioning can include configuring a client device 100 to display a login interface that is configured for a particular school, classroom, or teacher, or student. In an embodiment, a login interface presented to a student user of a client device 100 can display classes that are given in the room in which the student will use the client device 100. A login interface can further display a list of students in a particular class, in response to a student selecting a particular class listing. In an embodiment, a student can be presented a login prompt and the student enters a student user passcode to access the client device 100. The passcode can also provide access to cloud storage service(s) 130, backup server(s) 120, or web service(s) 140.

Client devices configured to operate in EDU mode can further be configured to perform data synchronization, tasks of a first user during operating of the client device 100 by a second, subsequent user, in an embodiment, the data synchronization task(s) of the first user can be performed as background tasks while the second, subsequent user operates the client device 100 using foreground processing.

A teacher work station 110 can comprise a desktop computer, such as an Apple® iMac®, a tablet computer, such as an Apple® iPad®, or other computing device 110 as described with reference to FIG. 12, below. A teacher work station 110 can be configured to initiate a log out of all students that are currently logged in to a classroom session of the teacher. For example, 5 minutes before the end of a class, the teacher can initiate a logout of all students. In response to the teacher-initiated logout of ail students, client devices 100 can begin identifying data that needs to be stored or synchronized to backup server 120, cloud service 130, or web service 140. If synchronization of the client device 100 data requires more than a predetermined timeout period, such as 1 minute or 3 minutes, then the synchronization tasks can be stored in a synchronization manifest for the student user. When a second, subsequent user logs in to the client device 100, the second subsequent user can operate the client device 100 in foreground mode, while the synchronization tasks for the first student user ran in the background.

Backup server 120 can comprise a computing system 1100 as described with reference to FIG. 12, below. In an embodiment, backup server 120 can store each user's data in an encrypted form. In an embodiment, the encryption can be based on, or derived from, the student user's passcode key.

Cloud services 130 can include cloud-based services such as Apple iCloud®, Google Docs, a cloud storage service, or other service to which client device 100 can synchronize data between the client device 100 and cloud storage service 130.

Figure 2:
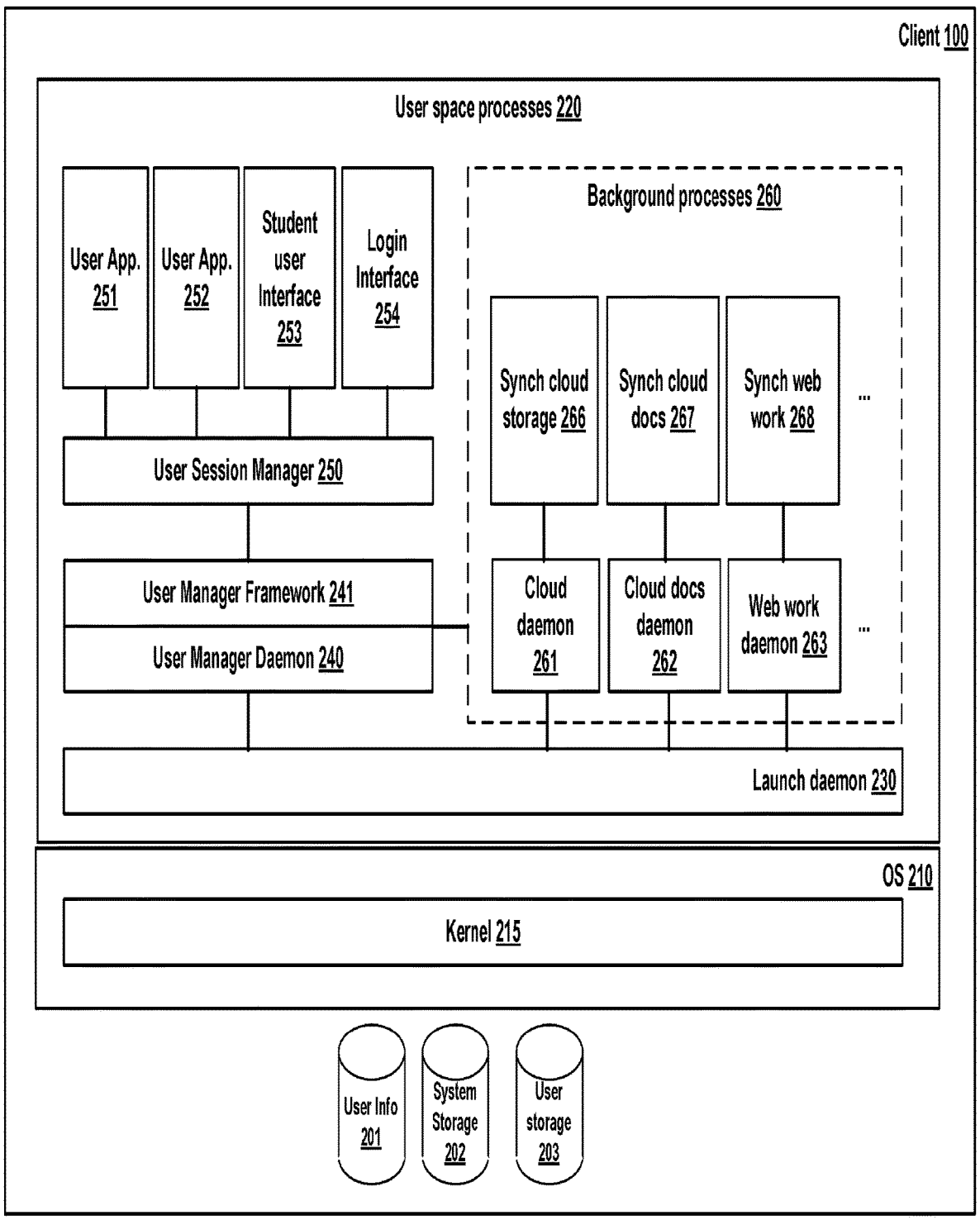
FIG. 2 illustrates, in block form, internal components of a client system in an educational computing environment, according to some embodiments.

Web services 140 can include email, social networks, on-line classrooms, document storage services, such as Dropbox®, and other web-based services FIG. 2 illustrates, in block form, internal components of a client device 100 in an educational computing environment, according to some embodiments.

Internal components of client device 100 can include storages 201-203, operating system 210, including kernel 215, and user-space processes 220. Internal components of client device 100 can communicate via interprocess communication, messaging, shared memory, sockets, or other communication channels.

Storages 201-203 can include RAM, ROM, flash memory, a hard disk, a solid state disk, CD-ROM, DVD-ROM, rewritable media, or other storage medium.

User information storage 201 can include a library of user identification information such as student users that have accessed, or are permitted to access, the client device 100 that contains the user information storage 201. User information storage 201 can further include information about each such student user, including a picture of the student user, a student name, student identification number, and other student-related information.

System storage 202 can include a system cache that can be persisted across users and reboots of the user-space, a "keybag" for a student user that is currently logged in on the client device 100, synchronization manifest(s), a display screen image that is to be displayed during transition from a login interface 254 as a system user to student user home page interface when the student user is logged in. A keybag can comprise a data structure that contains access keys for a student user, wherein each access key provides access to one of: a student user local storage 203, a backup server 120, one or more cloud services 130, or one or more web services 140. When a student user logs in using client device 100, login credentials can be authenticated and the one or more access keys can be generated from the login credentials. Login credentials are not stored locally. Login credentials can be authenticated at the backup server 120, cloud service (s) 130, or web service(s) 140. The keybag of the current student can be stored in a system cache in system storage 202. The system cache can be persisted across reboots of user-space during a power sequence. System storage 202 can also include a synchronization manifest for each of one or more student users.

A synchronization manifest for a student user can include a list of synchronization tasks to be performed on behalf of a first student user, while the client device 100 is being used by a second student user. A synchronization manifest can contain a synchronization task data structure for each item of data to be synchronized. A synchronization task can include a handle to a data structure to access the data to be synchronized, a handle to the application that generated the data to be synchronized, a keybag or pointer to a keybag, that, contains an access key to that enables access for that student user to the service (e.g. backup server 120, cloud service 130, or web service 140) for each synchronization task, check-pointing information that indicates progress and current state of the synchronization task, scheduling information for scheduling the synchronization task with respect to other synchronization tasks in the synchronization manifest, and other information that facilitates completion of the synchronization task. There can be a synchronization manifest for each of multiple student users in system storage 202 at a time. Synchronization manifests can be queued and scheduled according to scheduling logic, such as shortest task first, first-in-first-out, largest task first, data related to examinations first, and the like.

System storage 202 can further include a system cache that stores information that can be persisted across student users and user-space reboots, such as keybags, synchronization manifests, a login, screen to be displayed during a user-space reboot, or a logout screen that is displayed while logout processes are being completed and user-space is being rebooted.

User storage 203 can include data storage, such as one or more containers, in which each student can store their respective classroom session data. In an embodiment, each student's data can be encrypted. In an embodiment, encryption can be based at least in part on a key generated at least in part using the student user's passcode or other user credentials.

User-space processes 220 can include a launch daemon 230 ("LD"). Launch daemon 230 is an early boot task that can launch other daemons such as a user manager daemon 240, a user session manager 250 or synchronization daemon. User-space processes can further include background processes 260 and other processes within user-space 220. Other processes can include user applications 251 and 252, student user interface 253, and login interface 254. Launch daemon 230 can launch user manager daemon 240 ("UMD") as an early boot task. Functionality of user manager daemon 240 can be exposed via user manager framework 241. Calls to a framework or application programming interface ("API") are described below with reference to FIG. 11.

User manager daemon 240 can access user information data store 201 to retrieve the identification or a user of the client device 100. The user information can be passed to, e.g., login interface 254 or student user interface 253 to display user identification information while the client device 100 logs in a user or logs out a user. User manager daemon 240 can act as an arbiter, or traffic manager, that facilitates log in and log out of users. User manager daemon 240 can launch, or cause to be launched, user session manager 250 ("USM"). User manager daemon 240 can determine whether the computing device is performing a boot (e.g. a hard power on boot or device restart) and determined that the client device 100 should boot as the system user, to the login screen.

User session manager 250 can present an appropriate user-specific user interlace for display to a student user. For example, during a boot or reboot to a login screen, USM 250 can launch login interface 254 to obtain login credentials from a user. During a logout process, USM 250 can present a logout message on the student user interface 253 that is specific to a particular user. In an embodiment, student user interface 253 displays a status of a logout process while a logout and user-space reboot takes place. User-space processes, such as USM 250, user applications 251 and 252, login user interface 254, and student user interface 253, can register with UMD 240 to receive a notification that a "User Switch Request" has been made. A user switch request indicates that user-space processes are to begin saving application state, generating synchronization tasks for storage in a synchronization manifest, and begin shutting down. Each user-space process, e.g. 251-254, can notify UMD 240 when the process is about to be shut down by sending UMD 240 a "Ready to Switch Users" notification. In an embodiment, shutting down an application 251-254 includes determining application data that needs to be synchronized to, e.g., a cloud service 130 and storing a synchronization task record in a synchronization manifest in system storage 202 for retrieval after reboot of user-space to another student user.

Background processes 260 can include daemons, e.g. cloud daemon 261, cloud docs daemon 262, and web work daemon 263. Daemons 261-263 can spawn processes, e.g. sync cloud storage 266, synch cloud docs 267, and synch web work 268, that perform work on behalf of a particular student user. The synchronization manifest can contain one or more references to data to be backed up or synchronized to one or more backup servers 120, cloud services 130, or web services 140 on behalf of the particular user. The work can be performed by the applicable daemon generating a process, e.g. 266-268, on behalf of the user specified in the synchronization manifest. Daemons 261-263 and processes 266-268 can each register with UMD 240 to receive a "Switch User Requested" notification. A switch user request can be generated by UMD 240 in response to UMD 240 receiving a "User Logout Request". A User Logout Request can be generated in response to a user initiating a log out process, by a user pressing a power on reset button, or by kernel 215 initiating a system shutdown, such as due to the system running out of resources. A Switch User request can also be generated in response to a class-wide user logout command issued by at a teacher workstation 110, e.g., at the end of a class session.

In an embodiment, when a synchronization process 266-268 completes an item in the synchronization manifest, and the item is deleted from the synchronization manifest the applicable daemon, e.g. cloud daemon 261, can tear down the associated synch cloud storage process 266. Tearing down a process can include finishing any pending storage operations, storing process State as may be needed, and other activities to perform an orderly termination of a process. The daemon, e.g. 261, can then notify UMD 240 that the daemon 261 is terminating itself, then daemon 261 can proceed to terminate itself. If all work in the synchronization process has not completed at the time that a switch user request has been received, then the remaining daemons 261-263, for which there is work in the manifest, can cause their respective associated processes 266-268 to check-point their respective synchronization processes and store the checkpoint information in the manifest for processing on the next reboot to a student user.

FIGS. 3A through 3F illustrates a method of logging in and logging out of users of a client system in an educational computing environment, according to some embodiments. In FIGS. 3A through 3F, an embodiment of log in and log out screens is shown. Log in interface 254 can support a wide variety of log in interfaces, such as a conventional username and passcode prompt, a class roster selection, an alphabetic selection list of students, or other log in interface.

Figures 3A, 3B, 3C:
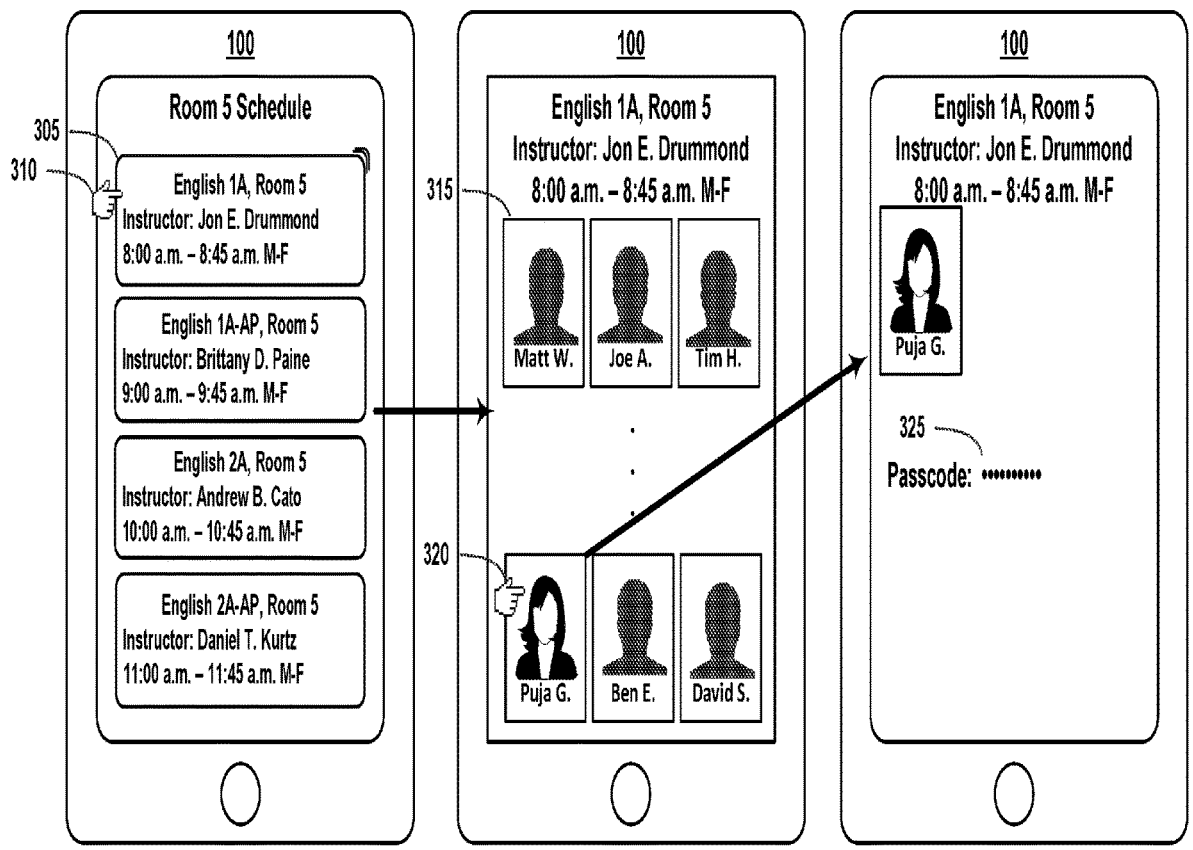

FIG. 3A illustrates an Interface that can be presented by login interface 254 when the client device 100 is booted up as a system user. Booting as the system user can be detected by user session manager 250 as a trigger to display a login screen. Logging in as a particular student, distinct from the system user, can be detected by user session manager 250 as a trigger to display a user interface appropriate for the particular student, such as the student's home screen. In FIG. 3A, client device 100 has been provisioned to use a classroom selection scheme to log in to client device 100. Login interface 254 presents a list of class sessions for room 5, including English 1A, English 1A-AP, English 2A, and English 2A-AP. A student can select a particular class 305 by clicking a pointer 310 on the particular class 305.

In FIG. 3B, login interface 254 can display a list of students 315 that are enrolled for English 1A. User session manager 250 can request student identification information, such as a name and picture, from user manager daemon 240 and present the list of students 315 that are enrolled for English 1A as a matrix of icon pictures of each student, along with the name of each student in a picture. The student user 320, "Puja G." can select herself for logging in by clicking on her own picture 320. Login interlace 254 can display a class session information for English 1A above the matrix of students enrolled in the class.

In FIG. 3C, Login interface 254 can display Puja G.'s picture and prompt for Puja G. to put in her passcode 325.

FIG. 3D, Login interface 254 can generate a status message 330, such as "Logging in . . . please wait." Login interface 254 can authenticate Puja G. against the entered passcode. Login interface 254 can then generate a unique identifier that acts as a cryptographic key and storage that key in system storage 202 for later use. Kernel 215 can ensure that the saved "frozen" screen is continuously displayed while the client device 100 prepares itself to boot as Puja G. "Freezing" the screen can comprise writing a screen image to a display buffer for continuous display during the reboot process. The screen can include displaying an animation, progress indicator, or other dynamic display item(s) during the reboot process. In an embodiment, the kernel and graphics subsystem can display an animation that is persisted on the screen while the client device 100 prepares itself to boot as Puja G.

Client device 100 then tears down user-space processes that were generated for Login interface 254 white the user was System user. The kernel 215 continues running. Only user-space processes are torn down. After client device 100 logs itself out of System user, and reboots, launch daemon 230 can relaunch user manager daemon 240, and user session manager 250. User manager daemon 240 can retrieve Puja G.'s key information from system, storage 202, e.g. user information 335. User manager daemon 240 can retrieve a list of applications 340 available to Puja G., retrieve any state information about Puja G. and her previous session(s) from user information data storage 201. User manager daemon 240 can pass this information to user session manager 250.

In FIG. 3E, user session manager 250 can cause Puja G.'s information to be displayed 335 on client device 100, Puja G. can select one or more applications 340 to perform her work. The applications may generate data that needs to be saved or synchronized to backup servers 120, cloud services 130, or web services 140, The student user interface 253 can include a logout button 345. A user can select the logout button with a click of a user interface 345, or an embodiment thereof, thereby generating a "switch, request" to user manager daemon 240. The switch request triggers actions that will tear down the user-space of Puja G., and subsequent reboot as the System user.

FIG. 3F, the switch request starts a series of clean Up processes. Application data that was generated by one or more applications 340 needs to be saved to backup server 120, synchronized to cloud storage 130, or web service 140. User session manager 250 can marshal the data to be saved from the respective applications, and begin a saving or synchronizing process for the data. A status message 350 can be displayed by user session manager 250 regarding the log out progress. Applications that do not generate data to be synchronized can be terminated. After a predetermined period of time, e.g. 1 to 3 minutes, if the data to be saved or synchronized has not completed saving or synchronizing, user session manager 250 can generate an entry in a synchronization manifest for each incomplete saving or synchronizing operation. The manifest can include access keys necessary to access the backup server 120, cloud storage 130, or web service 140 after a reboot to a subsequent user.

Figure 4A:
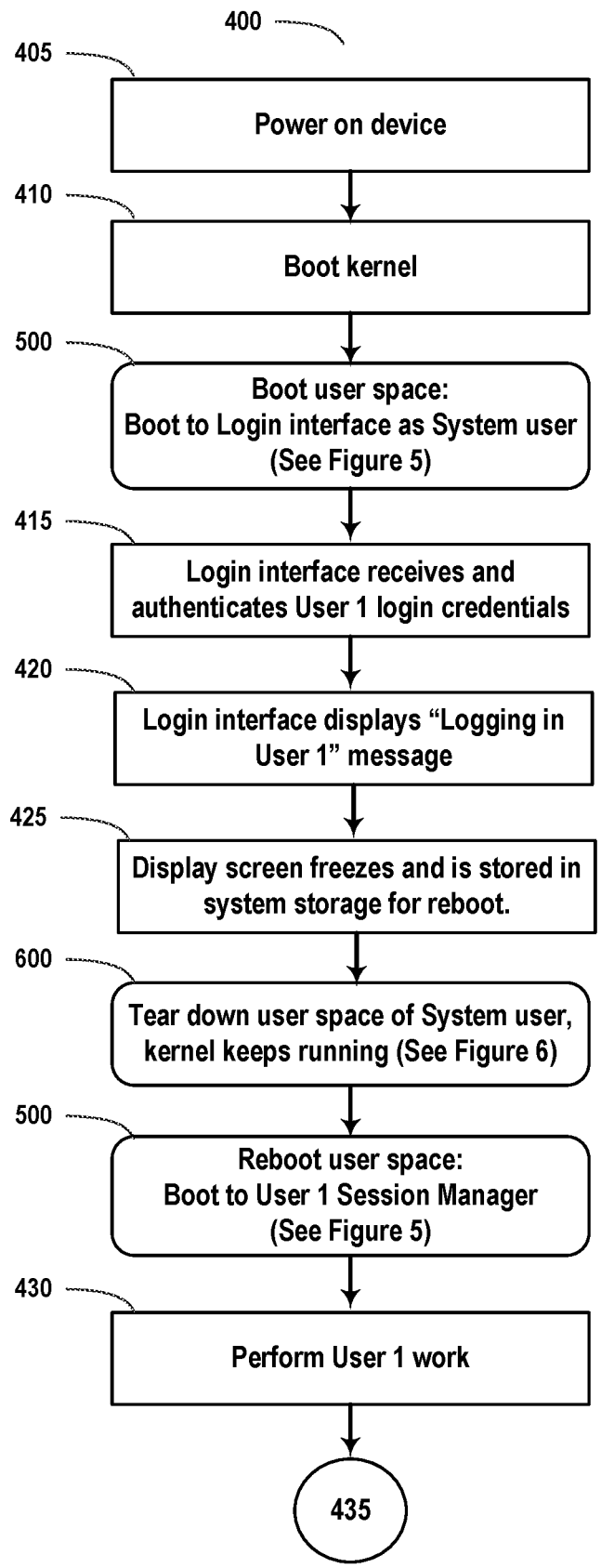
FIGS. 4A through 4C illustrate a method of logging in and logging out of users of a client system in an educational environment, according to some embodiments.
Figure 4B:
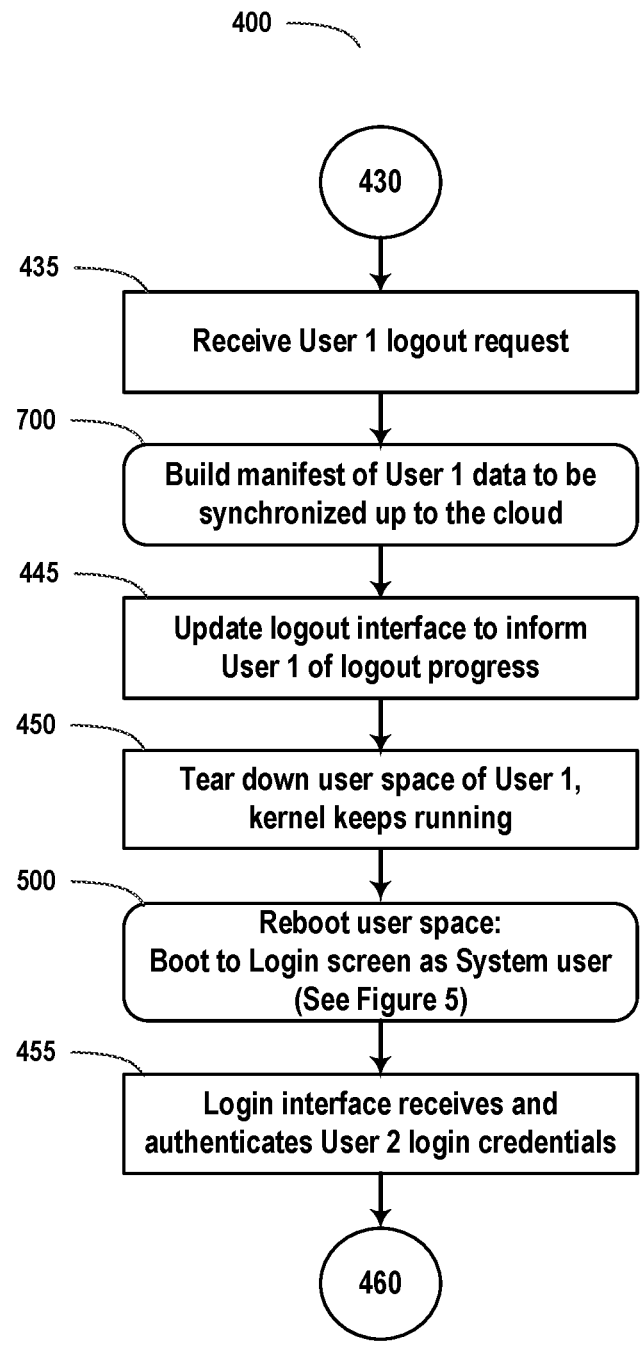
Figure 4C:
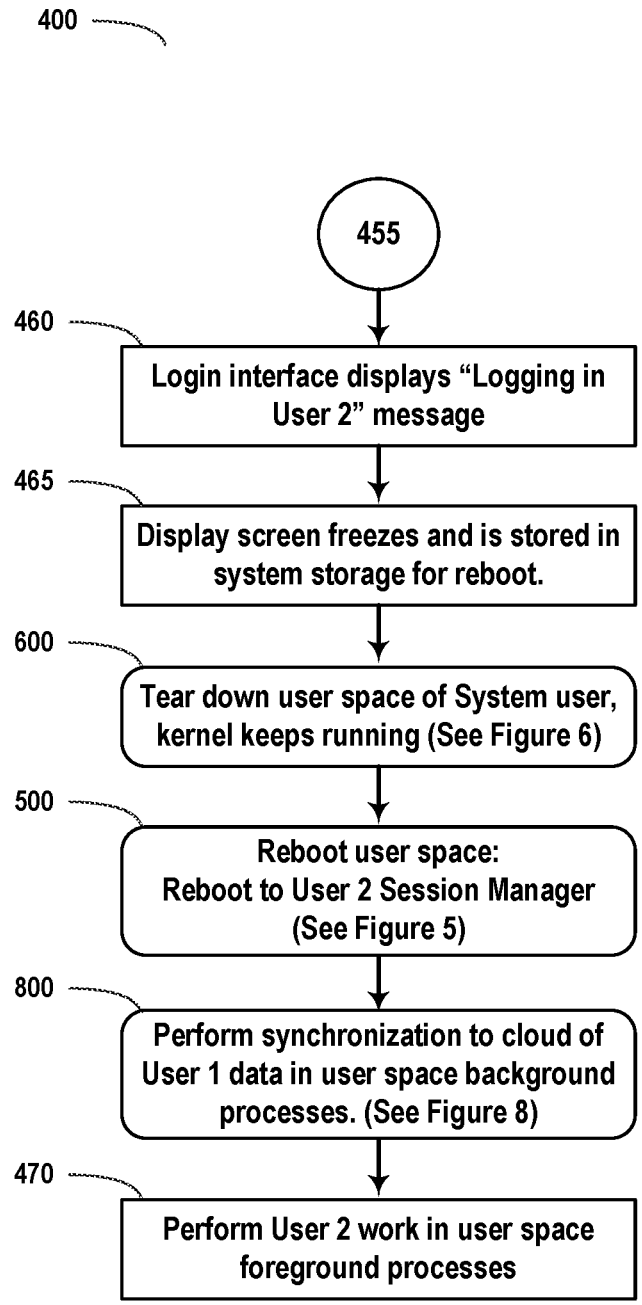

FIGS. 4A through 4C illustrate a method 400 of logging in and logging out of users of a client system 100 in an educational environment, according to some embodiments.

In operation 405, a user can power on the client device 100.

In operation 410, the kernel 215 can be booted, along with other operating system level processes.

In operation 500, the client device 100 boots its user-space processes 220. Specifically, the user-space processes 220 boot tip to a login interface 254 as the System user (as distinguished from a student user). The system user can comprise the "root" user of an operating system, or other user that an operating system can define to nm system-defined processes) that are not launched in response to a user login. The operations that boot the user-space to a login interface 254 are described in detail with reference to FIG. 5, below.

In operation 415, login interface 254 can receive student user credentials for logging in to the client device 100 as a first user, "User 1." An embodiment of a login interface 254 receiving login credentials is illustrated in FIGS. 3B and 3C. Student user login credentials can be authenticated locally on client device 100 or remotely at backup server 120, cloud service(s) 130, or web service(s) 140. In an embodiment, authentication of student user login credentials can authorize access to one or more of backup server 120, cloud service(s) 130, or web service(s) 140, causing one or more access keys to be generated that permit the student user to access one or more of: local encrypted user storage 203, backup server 120 services, cloud services 130. In an embodiment, a student user keybag can be stored in system storage 202 and can be persisted across user-space reboots and different student users of the same client device 100. A keybag data structure is described above with reference to FIG. 2, System Storage 202.

In operation 420, login interface 254 can display a message such as "Logging in Student User 1 . . . ".

In operation 425, the display message can be persisted by storing the display screen containing the message in system storage 202. The display message can be displayed from the time that the user is authenticated, during which the active user is the System User, through authentication of the student user in operation 415, and up through the time that the user-space 220 has been rebooted for the student user and the student user home page is displayed.

In operation 600, the user-space processes 220 can be torn down in preparation for a reboot of the client device 100. Tearing down processes can include activities such as completing the closing of open file(s), flushing buffers, completing pending synchronization processes, in preparation for an orderly termination of a process. After reboot of the client device, the active user will be the student user that logged in using the login interface 254 in operation 415, above. Details of operation 600 are described below with reference to FIG. 6.

In operation 500, client device 100 can reboot user-space 220 with the student user as the active user. Rebooting the user-space 220 of the client device 100 with the student user as the active user is described below with reference to FIG. 5. At the end of the reboot of user-space 220 with the student user as the active user, a home page for the student user can be displayed. In an embodiment, the home page can be specific to a particular student user.

In operation 430, the student user can begin performing student user work as a first user, "User 1." Performing user work can include interacting with the student user home page, launching one or more applications 251 and 252, or logging out by, e.g., clicking on a logout button 345 of the home page.

Method 400 continues at operation 435, described below with reference to FIG. 4B.

On FIG. 48, in operation 435, student user User 1 can generate a logout request. In an embodiment, the logout request can be generated by, e.g., User 1 clicking on a logout button 345 of the homepage.

In operation 700, in response to receiving the logout request, client device 100 can begin backing up or synchronizing data to backup server 120, cloud service 130, or web service 140. In an embodiment, the logout process can generate a synchronization manifest of User 1 data to be backed or synchronized with backup server 120, cloud services 130, or web services 140. In an embodiment the synchronization manifest can be built and stored in system storage 202 in response to a predetermined period for backing up or synchronizing data timing-out. Operation 700 is described in detail, below, with reference to FIG. 7.

In operation 445, user session manager 250 can generate and update a logout interface 350 that informs the user about progress of the logout process that was initiated in response to receiving the User 1 logout request in operation 435. An example of a logout interface is described above with reference to FIG. 3F. A logout interface can include displaying a message such as, "Logging out . . . waiting on:," followed by a list of application data that is being synchronized or backed up.

In operation 450, User 1 user-space processes can be torn down in preparation for a reboot of the user-space 220 as the system user. The kernel 215 continues running during the user-space 220 reboot.

In operation 500, client device 100 reboots user-space 220 as the system user. The reboot culminates in display of the login interface 254, as the system user. Operation 500 is described in detail, below, with reference to FIG. 5.

In operation 455, login interface 254 can receive student user credentials for logging in to the client device 100 as a second user, "User 2." An embodiment of a login interface 254 receiving login credentials is illustrated in FIGS. 3B and 3C. Student user login credentials can be authenticated locally on client device 100 or remotely at backup server 120, cloud service(s) 130, or web servicer(s) 140. In an embodiment, authentication of student user login credentials can authorize access to one or more of backup server 120, cloud service(s) 130, or web service(s) 140, causing one or more access keys to be generated that permit the student user to access one or more of: local encrypted user storage 203, backup server 120 services, cloud services 130. In an embodiment, a student user keybag can be stored in system storage 202 and can be persisted across user-space reboots and different student users of the same client device 100. A keybag data structure is described above with reference to FIG. 2, System Storage 202.

Method 400 continues at operation 460, described below with reference to FIG. 4C.

On FIG. 4C, in operation 460, login interface 254 can display a message such as "Logging in Student User 2 . . . ".

In operation 465, the display message can be persisted by storing the display screen containing the message in system storage 202. The display message can be displayed from the time that the user is authenticated, during which the active user is the system user, through authentication of the student user "User 2" in operation 455, and up through the time that the user-space 220 has been rebooted for the student user "User 2" and the student user home page is displayed.

In operation 600, the user-space processes 220 can be torn down in preparation for a reboot of the client device 100 as student user "User 2." The kernel process 215 continues running. After reboot of the client device 100, the active user will be the student user "User 2" that logged in using the login interface 254 in operation 460, above. Details of operation 600 are described below with reference to FIG. 6.

In operation 500, client device 100 can reboot user-space 220 with the student user "User 2" as the active user. Rebooting the user-space 220 of the client device 100 with the student user as the active user is described below with reference to FIG. 5. At the end of the reboot of user-space 220 with the student user "User 2" as the active user, a home screen or other initial user interface for the student user can be displayed. In an embodiment, the home page can be specific to a particular student user, e.g. "User 2."

In operation 800, system storage 202 can be checked to determine whether a synchronization manifest was generated for student user "User 1" during User 1's classroom session. If so, then processes can be generated in user-space 220 to process User 1's synchronization manifest while User 2 uses the client device 100. In an embodiment, User 2 processing is performed in the foreground, while User 1 synchronization processes are performed in the background.

Processing of the synchronization manifest is described in detail, below, with reference to FIG. 8.

In operation 470, the student user can begin performing student user work as a second student user, "User 2," Performing user work can include interacting with the student user home page, launching one or more applications 251 and 252, or logging out by, e.g., clicking on a logout button 345 of the user interface.

Figure 5:
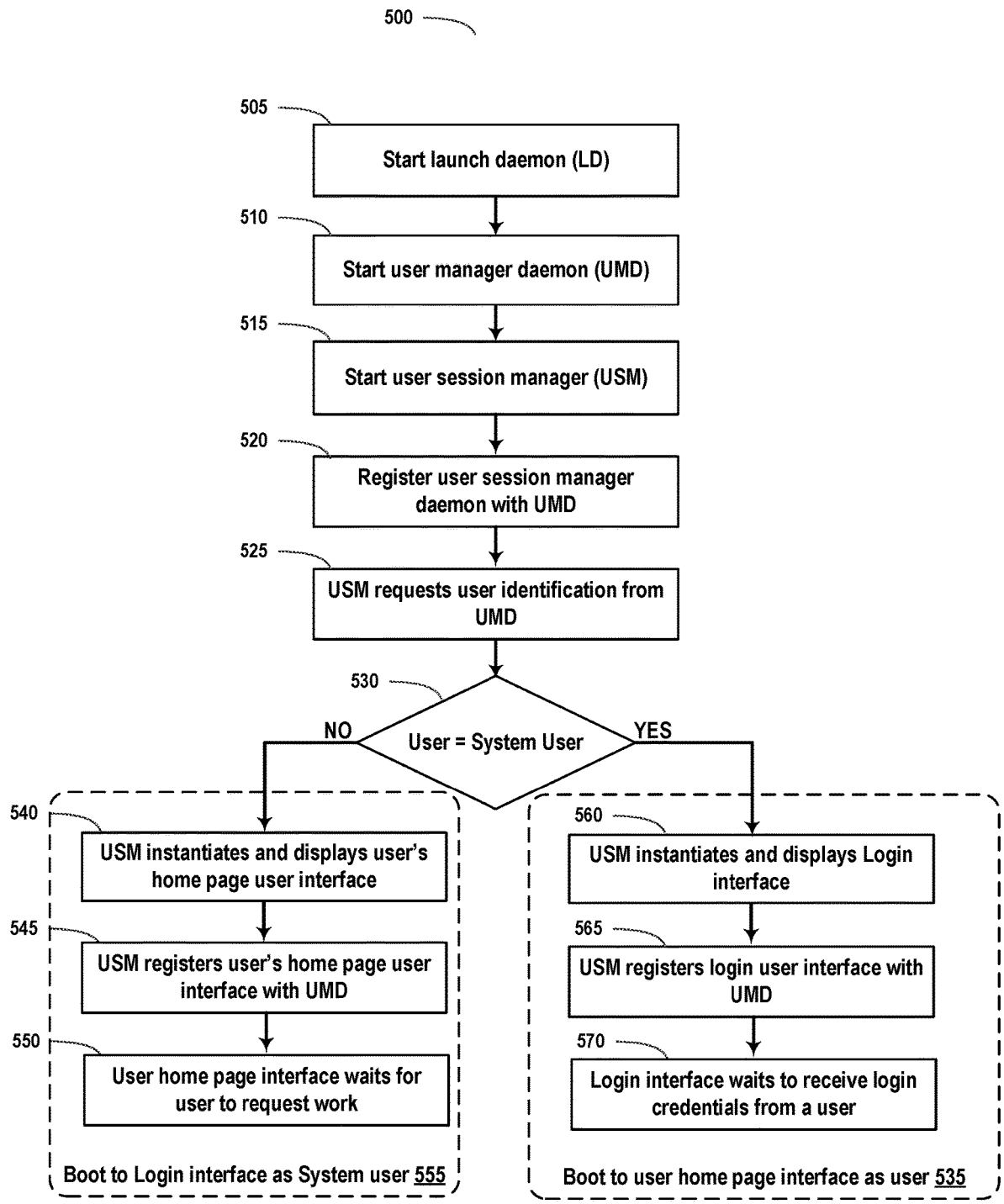
FIG. 5 illustrates a method of booting, or rebooting, user-space of a client system during logging in and logging out of a client system in an educational computing environment, according to some embodiments.

FIG. 5 illustrates a method 500 of booting, or rebooting, user-space 220 of a client device 100 during logging in and logging out of a client system in an educational computing environment, according to some embodiments. During booting or rebooting of user-space 220, kernel 215 continues to run.

In operation 505, kernel 215 can start a launch daemon 230. Launch daemon 230 is an early boot task that enables launching and management of processes that run in user-space 220.

In operation 510, launch daemon 230 can start a user manager daemon 240 ("UMD"). UMD 240 is also an early boot task. UMD 240 can manage processes in user-space 220 with respect to switching users. Operation of UMD 240 is described in detail below, with respect to FIGS. 9A and 9B.

In operation 515, launch daemon 230 can start a user session manager 250 ("USM"). USM 250 can provide a user interface for student users, e.g. User 1 and User 2, such as a home page for launching applications and logging out. USM 250 can receive user requests to launch an application 251 and 252 and can then cause applications 251 or 252 to be launched. In an embodiment, USM 250 can call launch daemon 230 to cause the launch of applications 251 or 252.

In operation 520, USM 250 can register itself with HMD 240 to receive a notification from UMD 240 that a Switch User Request has been generated A Switch User Request can be generated by a student user logging out of client device 100, e.g., by clicking on a logout button 345. A Switch User request can also be generated in response to a class-wide user logout command issued by at a teacher workstation 110, e.g., at the end of a class session. A Switch User request can be generated by login interface 254 in response to login interface 254 receiving and authenticating login credentials from a student user. A Switch User request can be generated by the kernel, e.g., when system resources have become critically low. A Switch User request can also be generated by a hardware event, such as a power on reset button being pressed.

In operation 525, USM 250 requests Identification information from UMD 240 about the current user. The current user can be either the system user, e.g. during a user-space 220 boot/reboot to a login screen, or a logged in student user, e.g. User 1 or User 2.

In operation 530, it can be determined whether the current user is the system user or a student user.

In response to determining, in operation 530, that the current user is a student user, the user-space 220 boot process performs operations in block 535 for booting to the student user's home page as the student user. Block 535 includes operations 540, 545, and 540.

In operation 535, USM 250 can instantiate and display the student user's home page user interface.

In operation 545, USM 250 can register the user's home page interface with UMD 240 so that home page interface can receive a notification from UMD 240 when a Switch User Request has been generated.

In operation 550, USM 250 the student user home page interface can wait for the student user to request work, such as launching an application 251 or 252, or logging out 345.

In response to determining, in operation 530, that the current user is the system user, the user-space 220 boot process performs operations in block 555 for booting to a login interface 254 as the system user, beginning at operation 560. Block 555 includes operations 560, 565, and 570.

In operation 560, USM 250 can instantiate and display a login interface 254.

In operation 565, USM 250 can register the login interface 254 with UMD 240 so that login interface 254 can receive a notification from UMD 240 when a Switch User request is generated.

In operation 570, login interface 254 can wait to receive login credentials from a student user, e.g. User 1 or User 2.

Figure 6:
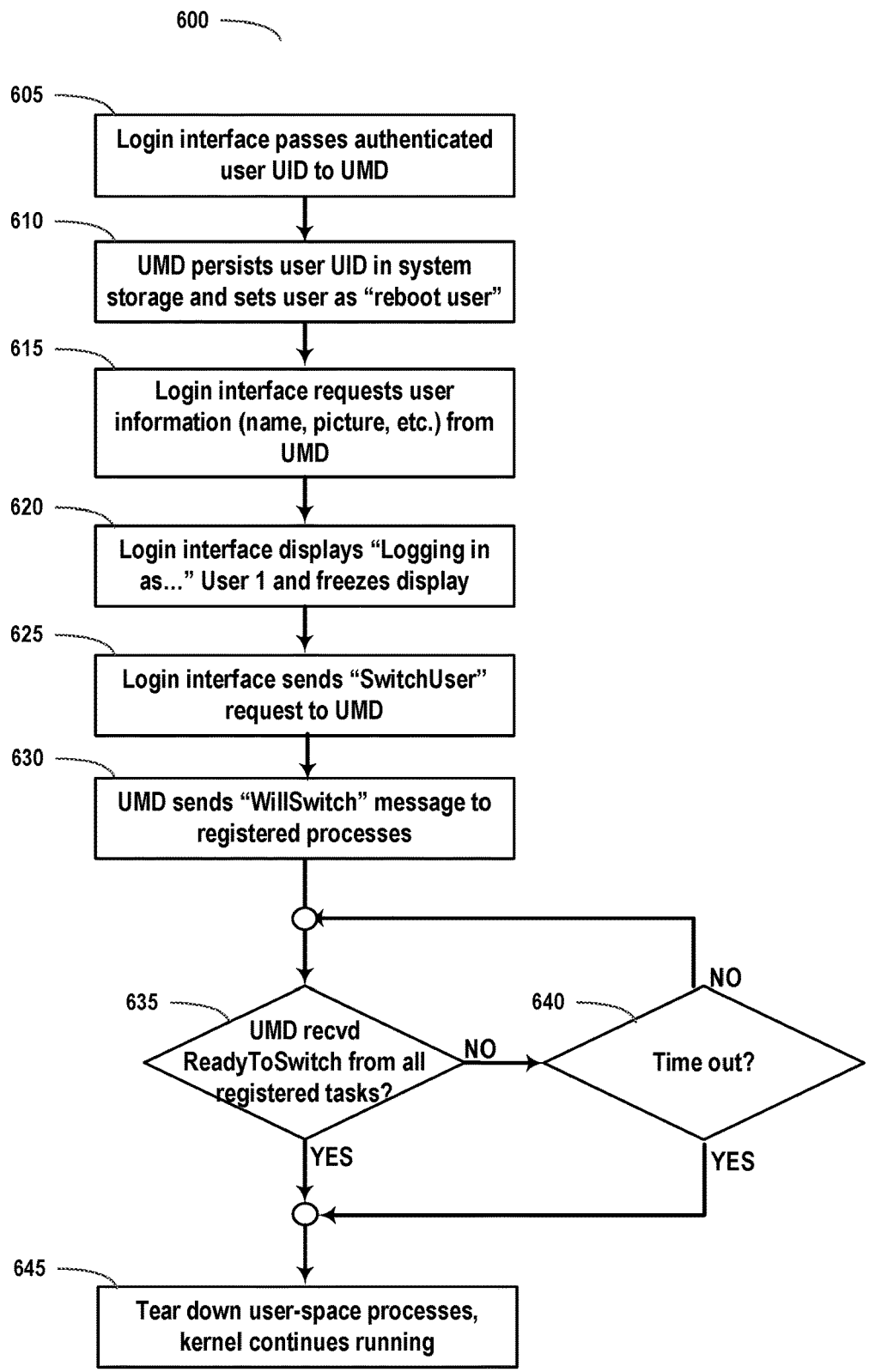
FIG. 6 illustrates a method of tearing down user-space of a client system in a computing environment, after logging in to the client system, according to some embodiments.

FIG. 6 illustrates a method 600 of tearing down user-space 220 from a login screen, when the current user is the system user, in response to receiving login credentials for a student user.

In operation 605, login interface 254 can pass to UMD 240 authenticated credentials of a student user, including a student user unique identifier (UID), and one or more access keys generated at least in part from the student user login credentials.

In operation 610, UMD 240 can persist the UID and access keys in a "keybag" in system storage 202, as described above with reference to FIG. 2. UMD 240 can also persist the UID and one or more access keys in system storage 202 to indicate that the student user having this UID is the "next" or "reboot" user that will become the current user after reboot of user-space 220.

In operation 615, login interface 254 can request user information, such as the student user UID, name, picture, etc., from UMD 240. UMD 240 can obtain this information from user information library 201 and return the information to login interface 254.

In operation 620, Login interface 254 can display a login message, such as "Logging in as User 1" on the display. Login interface 254 can persist the login message on the display and write the display screen to system storage 202. During reboot of user-space 220, the login message can be "frozen" or persisted on the display screen while user-space 220 processes are being torn down, and a reboot of user-space processes is performed. From the perspective of the student user, the reboot of user-space from the system user to the student user merely appears as a single process.

In operation 625, login interface 254 can generate a Switch User Request to UMD 240. HMD 240 can send a notification that a Switch User Request has been received, to each user-space process that registered with UMD 240 to receive such notifications. A timer can be set for user-space processes to have time to prepare to switch users.

In operation 630, UMD 240 can send a "Will Switch Users" notification to registered user-space processes 220 as a final notification that tear down of user-space processes 220 is about to begin. In an embodiment, UMD 240 can wait a predetermined additional amount of time after sending the Will Switch Users notification so that registered user-space processes 220 can make any final preparations for reboot.

In operation 635, it can be determined whether UMD 240 has received a Ready To Switch Users notification from all registered user-space processes.

If, in operation 635, it is determined at least one registered user-space process has not responded to UMD 240 with a Ready To Switch Users notification, then in operation 640 it can be determined whether the timer for preparation for switching users has expired. If, in operation 640, the timer has not expired, then method 600 returns to operation 630, otherwise method 600 continues at operation 635.

If, in operation 635, it is determined that all registered user-space processes have responded to UMD 240 with a Ready To Switch Users notification, then method 600 continues at operation 645.

In operation 645 tear down of user-space processes 220 is performed in preparation for reboot as a student user, e.g. User 1 or User 2. Kernel 215 continues running.

Figure 7:
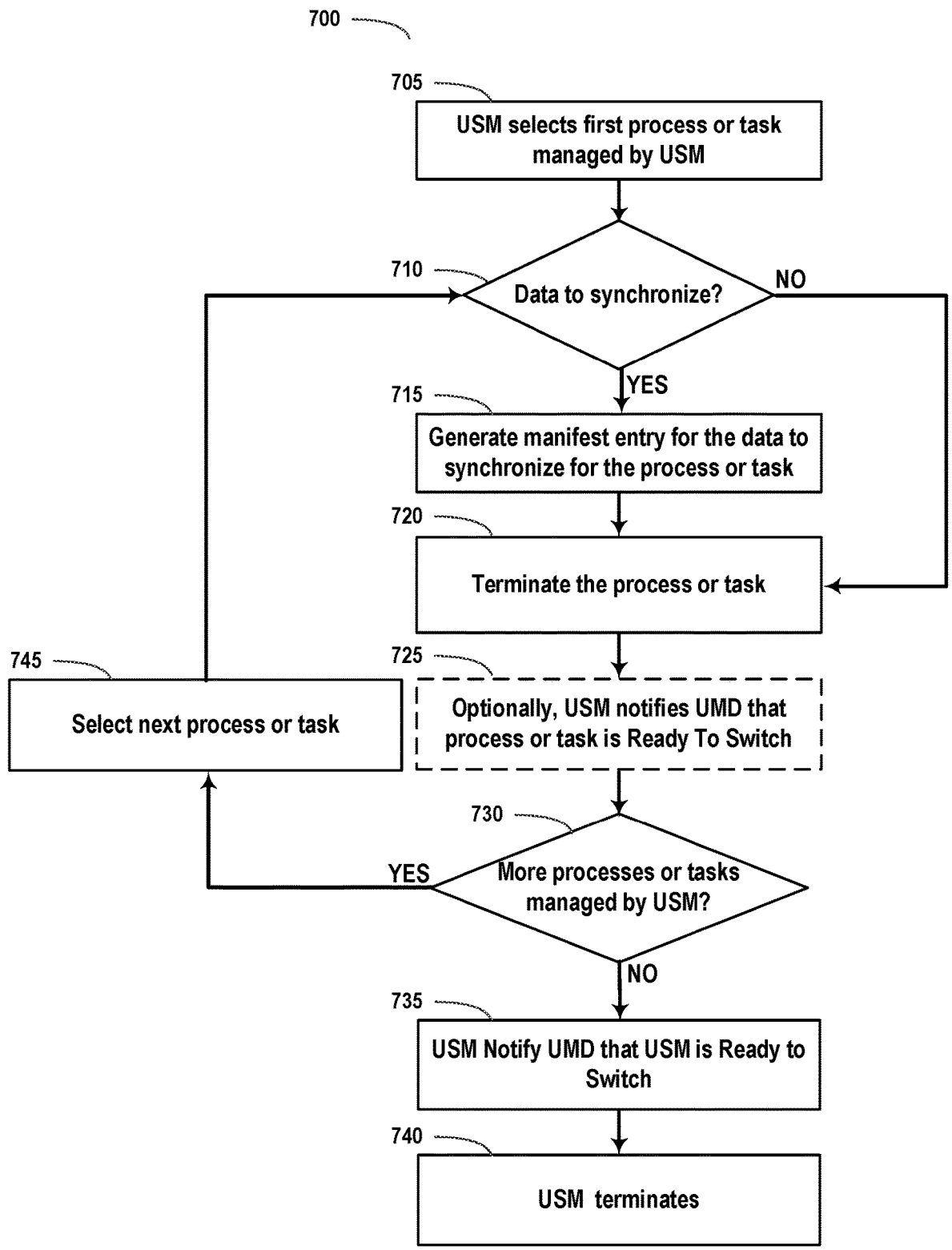
FIG. 7 illustrates a method of generating a manifest of user data items for synchronization after a user-space reboot of a client system in an educational computing environment, according to some embodiments.

FIG. 7 illustrates a method 700 of generating a manifest of user data items for synchronization after a reboot of user-space processes 220 of a client system in an educational computing environment, according to some embodiments.

In operation 705, USM 250 can select a first user-space process or task 220 that USM 250 caused to be launched during a student user classroom session.

In operation 710, it can be determined whether the user-space process or task 220 has data that needs to be backed up or synchronized to backup server 120, cloud services 130, or web services 140 (individually or collectively, "synchronized").

If, in operation 710, it is determined that the user-space process or task 220 does have data that needs to be synchronized, then in operation 715 a synchronization task for the current student user and user-space process or task 220 can be generated and stored in a synchronization manifest for the current student user. The method 700 continues at operation 720.

In operation 720, the user-space process or task 220 can be terminated.

In operation 725, USM 250 can optionally notify UMD 240 that user-space process or task 220 is Ready To Switch Users.

In operation 730, it can be determined whether there are more user-space processes or tasks managed by USM 250.

If, in operation 730, it is determined that there are more user-space processes or tasks 220 that are managed by USM 250, then in operation 745 a next user-space process or task 220 managed by USM 250 can be selected. The method returns to operation 710.

If, in operation 730, it is determined that there are not more user-space processes or tasks 220 managed by USM 250, then in operation 735 USM 250 can notify UMD 240 that USM 250 is Ready To Switch Users.

In operation 735, USM 250 can be terminated.

Figure 8:
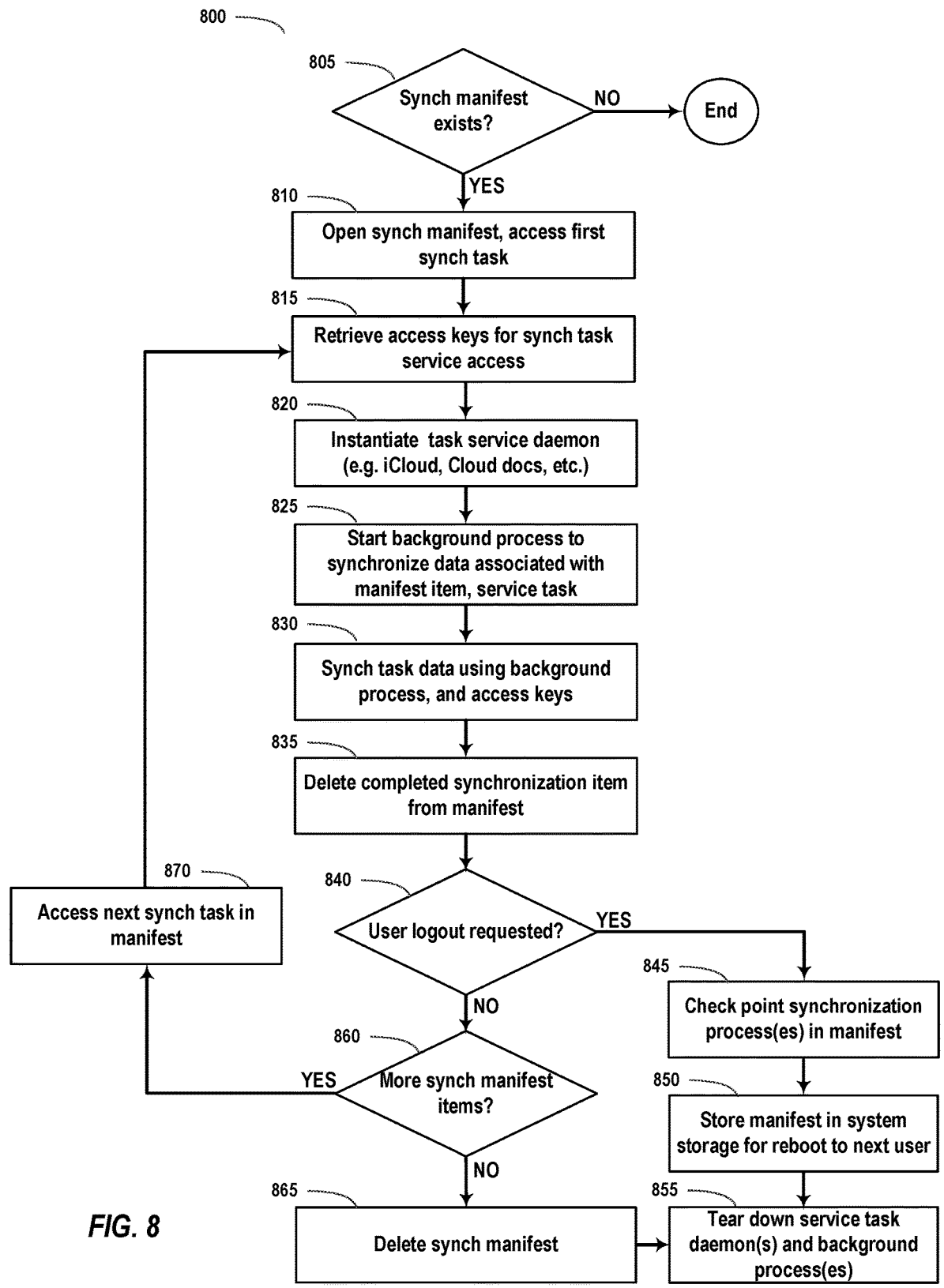
FIG. 8 illustrates a method of processing a synch ionization manifest of user data items for synchronization after a user-space reboot of a client system in an educational computing environment, according to some embodiments.

FIG. 8 illustrates a method 800 of processing a synchronization manifest of user data items for synchronization after a reboot of user-space processes 220 of a client device 100 in an educational computing environment, according to some embodiments. Method 800 will be described with respect to a single synchronization manifest. In an embodiment, there may be more than one synchronization manifest in system storage 202, each synchronization manifest representing one or more synchronization tasks to be performed on behalf of a different student user.

In operation 805, it can be determined whether system storage 202 contains a synchronization manifest to be processed. In an embodiment, UMD 240 can make the determination whether a synchronization manifest is stored on system storage 202.

If, in operation 805, it is determined that system storage 202 does not contain a synchronization manifest, then method 800 ends. Otherwise, method 800 continues at operation 810.

In operation 810, a synchronization manifest, e.g. for student user "User 1," can be retrieved from system storage 202. A first synchronization task can be retrieved from the synchronization manifest. In an embodiment, UMD 240 can open and read the synchronization tasks within the synchronization manifest.

In operation 815, one or more access keys for the first synchronization task can be retrieved. In an embodiment, retrieving the one or more access keys can comprise reading the keys from a keybag data structure stored within the synchronization manifest. In an embodiment, retrieving the one or more access keys can comprise dereferencing a pointer or handle, or storage location, where the one or more access keys can be obtained. In an embodiment, UMD 240 can retrieve the one or more access keys.

In operation 820, a first daemon 261-263 that can instantiate one or more processes to perform the first synchronization task can be instantiated. In an embodiment, first daemon 261-263 can register with UMD 240 to receive a notification when a Switch User Request is generated. In an embodiment, UMD 240 can call launch daemon 230 to instantiate the first daemon 261-263. In an embodiment, the first daemon can be instantiated as a background task 260 in user-space processes 220. In an embodiment, first daemon 261-263 may already be instantiated, performing work for a current student user, e.g. User 2, distinct from User 1. In such case, launch daemon 230 can return to UMD 240 an access path to first daemon 261-263, rather than instantiating a second copy of first daemon 261-263.

In operation 825, first daemon 261-263 can spawn, or cause the launching of, a first synchronization process 266-268 that will perform the synchronization work associated with the first synchronization task in the synchronization manifest. In an embodiment, first synchronization process 266-268 can register with UMD 240 to receive a notification when a Switch User Request is generated. In an embodiment, first synchronization process 266-268 can be instantiated as a background task 260 in user-space processes 220. In an embodiment, first synchronization process 266-268 can call one or more portions of an applications 251 or 252 that generated the data to be synchronized in the first synchronization task. The call can be via an application programming interface ("API").

In operation 830 the synchronization task can be executed, using the first synchronization process and/or first synchronization daemon, and the one or more retrieved access keys.

In operation 835, when the first synchronization task is completed, the first synchronization task can be deleted from the synchronization manifest. In an embodiment, the first synchronization process 266-268 can be terminated and HMD 240 can be notified of the termination of first synchronization process 266-268. In an embodiment, if the current student user "User 2" is using first synchronization daemon 261-263, then first synchronization daemon 261-263 can remain running, otherwise first synchronization daemon 261-263 can be terminated.

In operation 840, it can be determined whether a user logout has been requested by the current student user, e.g. "User 2" and a Switch User Request has been generated.

If, in operation 840, it is determined that a Switch User Request has been generated, then in operation 845, the processing of the synchronization manifest can be checkpointed in the manifest.

In operation 845, the synchronization manifest can be Stored in system storage 202.

In operation 850, any running synchronization tasks that are servicing only the synchronization manifest can be terminated and UMD 240 can be notified of the termination.

Any running synchronization daemons that are servicing only the synchronization manifest can also be terminated and UMD 240 can be notified of the termination.

In operation 855, the first daemon and first synchronization process can be torn down.

If, in operation 840, it is determined that a logout was not requested, and therefore no Switch User Request was generated, then in operation 860 if can be determined whether there are any more synchronization tasks remaining in the synchronization manifest.

If, in operation 860, it is determined that there are no more synchronization tasks remaining in the synchronization manifest, then in operation 865, the synchronization manifest can be deleted from system storage 202 and the first daemon and first synchronization process can be tool down as in operation 855.

If, in operation 860, it is determined that there are more synchronization tasks remaining in the synchronization manifest, then in operation 870 a next synchronization task can be retrieved from the synchronization manifest, and method 800 continues at operation 815.

Figure 9A:
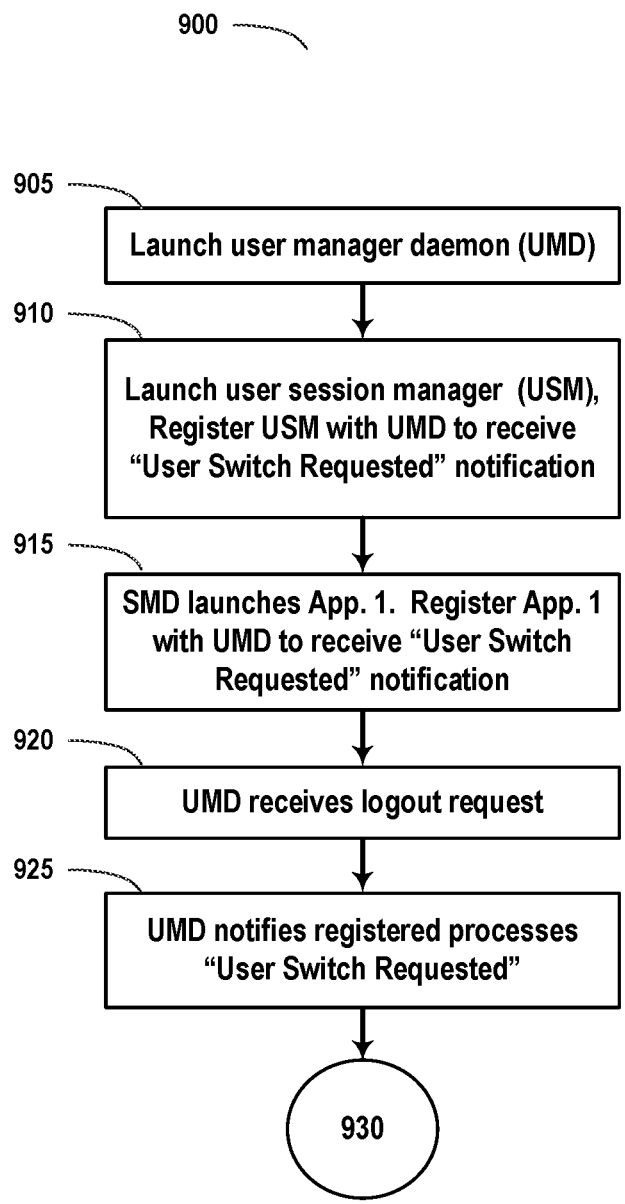
FIGS. 9A and 9B illustrate a method of operation 900 of a user manager daemon according to some embodiments.
Figure 9B:
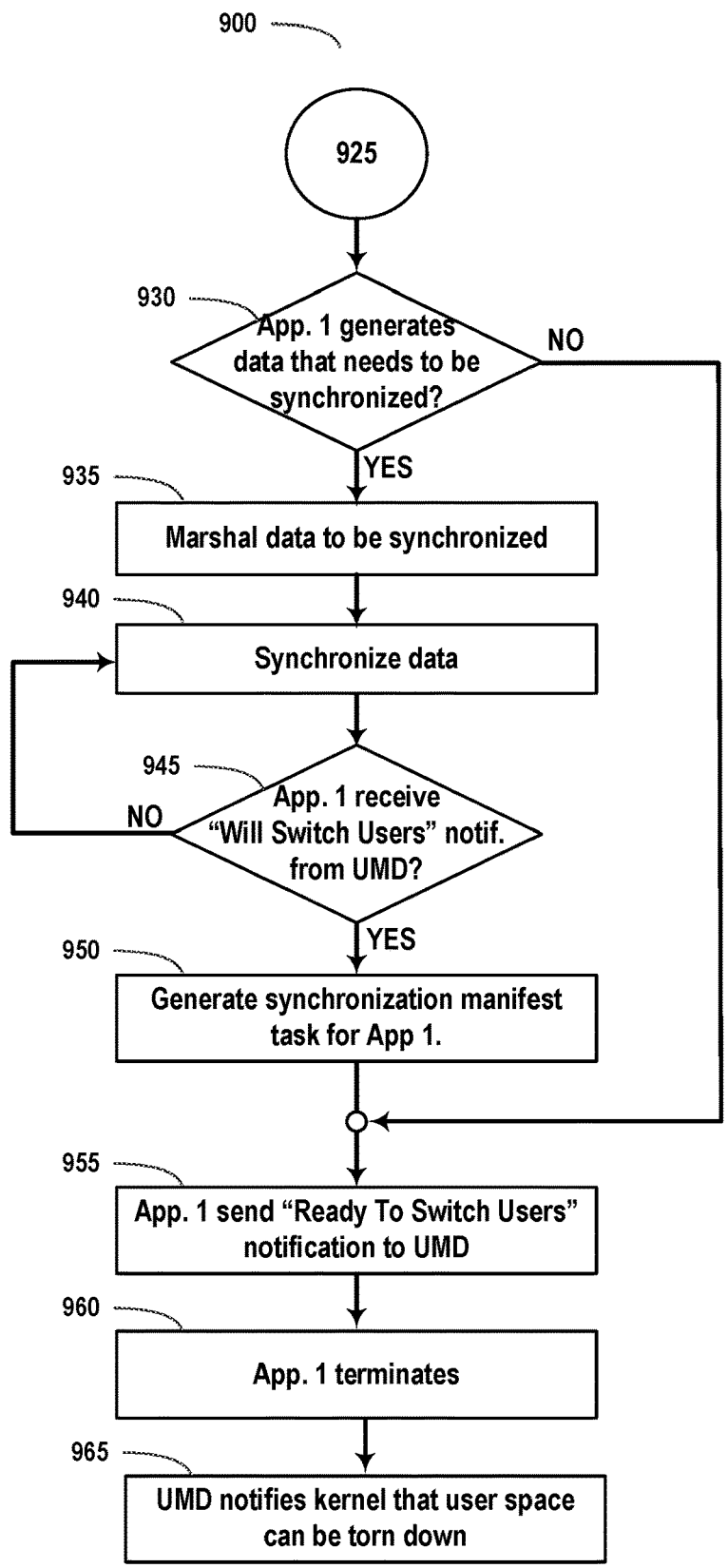

FIGS. 9A and 9B illustrate a method of operation 900 of a user manager daemon (UMD) 240 according to some embodiments. UMD 240 is an early boot task that can manage switching of users in a client device 100 that supports a serial single-user operation by multiple users, UMD 240 manages orderly shutdown of user-space processes 220 when UMD 240 receives a request to logout the current user. Method 900 is described with reference to only a single user-space process, App. 1. However, UMD 240 can manage an orderly reboot of a plurality of processes in the same manner as described for App. 1.

An application that generates data to be synchronized can begin synchronizing the data in response to receiving a "Switch User Requested" notification from UMD 240. UMD 240 can wait for a predetermined period of time for App. 1 to perform the synchronization. After the predetermined period of time expires. UMD 240 can send App. 1 a notification "Will Switch Users," indicating that App. 1 needs to get ready to be terminated in a second predetermined amount of time. App. 1 can generate a synchronization task for a synchronization manifest in response to receiving the "Will Switch Users" notification. App. 1 can then inform UMD 240 that App. 1 is Ready to Switch Users, then App. 1 can terminate itself, or be terminated.

On FIG. 9A, in operation 905, launch daemon 230 can launch UMD 240.

In operation 910, user session manager (USM) 250 can be launched. USM 250 can register with UMD 240 to receive a "Switch User Requested" notification in response to UMD 240 receiving a user logout request. USM 250 can also assert to UMD 240 that it should not switch users until UMD 240 receives a "Ready to Switch Users" notification from USM 250. UMD 240 can override USM 250's request after a predetermined period of time expires.

In operation 915, a first application 251 or 252 ("App. 1") can be launched. App. 1 can register with UMD 240 to receive a "Switch User Requested" notification in response to UMD 240 receiving a user logout request. App. 1 can also assert to UMD 240 that it should not switch users until UMD 240 receives a "Ready to Switch Users" notification from App. 1. UMD 240 can override the request not to switch after a predetermined period of time expires.

In operation 920, UMD 240 can receive a user logout request. A user logout request can be received from, e.g. a user clicking on a "logout" button 345 on a user interface displayed by USM 250.

In operation 925, UM D can send a "User Switch Requested" notification to registered processes, e.g. App. 1 and USM 250, in response to UMD 240 receiving a user logout request in operation 920.

Method 900 continues at operation 930, described below with reference to FIG. 9B.

On FIG. 9B, in operation 930, App. 1 can determine whether App. 1 generates data that needs to be synchronized with a backup server 120, a cloud service 130, or a web service 140 ("synchronizing"). An application that does not generate data to be synchronized, such as a media player, can be terminated without performing any synchronization operations.

If, in operation 930, it is determined that App. 1 does not generate data that needs to be synchronized, then the method 900 resumes at operation 955. Otherwise the method 900 continues at 935.

In operation 935, App. 1 can marshal data to be synchronized.

In operation 940, App. 1 can begin synchronizing the data.

In operation 945, it can be determined whether App. 1 received a "Will Switch Users" notification from UMD 240, indicating that App. 1 needs to generate a synchronization task for a synchronization manifest.

If, in operation 945, it is determined that App. 1 has nor received a "Will Switch Users" notification from UMD 240, then App. 1 can continue synchronizing data in operation 940. Otherwise, in operation 950, App. 1 can generate a synchronization task for a synchronization manifest for this student user.

In operation 955, App. 1 can send a "Ready To Switch Users" notification to UMD 240. The notification indicates to UMD 240 that App. 1 is ready to terminate.

In operation 960, App. 1 can terminate, or be terminated.

In operation 965, UMD 240 can notify kernel 215 that user-space processes 220 can be torn down, and a reboot of user-space 220 can be performed.

Figure 10:
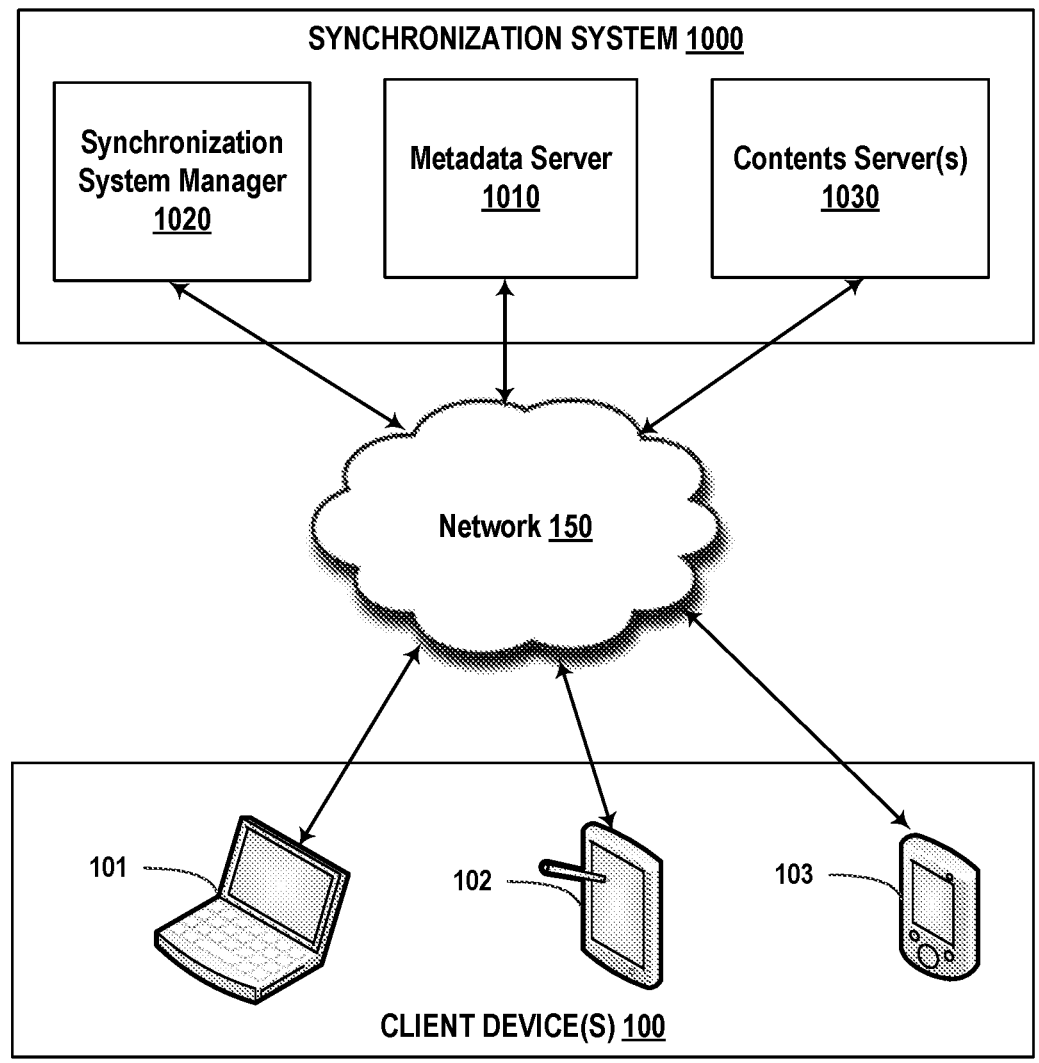
FIG. 10 illustrates in block diagram form, a data synchronization system having a plurality of clients in an educational computing environment, according to some embodiments.

FIG. 10 illustrates in block diagram form, a data synchronization system having a plurality of clients in an educational computing environment, according to some embodiments.

The synchronization system 1000 can include a metadata server 1010 and one or more contents servers 1030. In one embodiment, a contents server 1030 can store one or more types of user data sets. For example, a word processing documents contents server 1030, a video documents contents server, a Keynote presentation server, and the like. A contents server can also be configured on a per classroom, per subject matter, per instructor, per student, or other basis that organizes data in a logical manner. In an embodiment, a content server 1030 can be a cloud storage service capable of storing a wide variety of different user data set types. In one embodiment, the synchronization system 1000 can further include a synchronization management system 1020.

Initially, a client device 100 can store one or more user data sets from the file system of the client device 100 on the synchronization system 1000. A user data set, such as a file of word processing documents of a student using client 100, can be stored on the synchronization system 1000. In one embodiment, the user data set can be chunked into chunked data portions and stored on the one or more contents servers 1030. Metadata describing the user data set and metadata about the chunked portions of the user data set can be stored on the metadata server 1010 in a synchronization metadata database. In one embodiment, the metadata server 1010 and contents server 1030 can be managed using a synchronization management system 1020. Managing the metadata server 1010 can include providing software to the metadata server 1010 to resolve conflicts between various versions of data sets of a user, including conflicts resulting from different versions of a software that generated a data set. For example, if one client device of a user, e.g. 101, has word processor software that is version 2.0, and the user generates a word processing document using that client device and software, and the document is later downloaded using the synchronization system 1000 to a different client device of the user, e.g. 102 having version 1.0 of the word processor software, the version 1.0 software may not be able to open and/or edit the document that was generated by software version 2.0. Synchronization system manager 1020 can provide software updates and patches to the metadata server 1010 to adapt the document for use with both version 1.0 and version 2.0 of the word processing software.

The synchronization system 1000 can be interfaced to the client device(s) 100 via a network 150. The network 150 can be the Internet, a wireless network, a cellular network, a local area network, or any combination of these. Although the synchronization system manager 1020, metadata server 1010, and contents server 1030 have been shown as separate elements, connected via a network 150, this need not be the case. One or more of the synchronization system manager system 1020, metadata server 1010, or contents server 1030 can be implemented on the same host computer system or on several physically distributed computer systems. In addition, as described above, contents server 1030 can include one or more content servers 1030, any or all of which can store one or more types of user data sets. Communication between one or more of the synchronization system manager 1020, metadata server 1010, and contents server(s) 1030 can be by sockets, messages, shared memory, an application program interface (API), inter-process communication, or other processing communication service. Application programming interfaces ("APIs") are described in detail, below, with reference to FIG. 11.

A client device 100 can include a desktop computer system, a laptop computer system such as client device 101, a tablet computer system such as client device 102, a cellular telephone such as client device 103, a personal digital assistant (PDA) including cellular-enabled PDAs, a set top box, an entertainment system, a gaming device, or other consumer electronic device. The components of a client device 100 are described in detail, below, with reference to FIG. 12.

A user data set can include one or more of: a data file, a folder or directory, a word processing document, a spreadsheet, a presentation, entails, texts, user contacts, bookmarks, assets such as music, movies, and other purchased content, device settings, and application settings. Each of these can be a user data set. A user of a client device 100 can determine, on a per-device basis, whether a particular data set will, or will not, be synchronized with other of the user's client devices 100 using the synchronization system 1000.

Metadata about user data sets can include file system metadata and synchronization metadata. File system metadata can include a file ID, such as a POSIX file ID, a document ID, a creation date of the file, a date that the file was last modified, an identifier of the device that last modified the file, an identifier of the application and version of the application that modified the file, and a generation count for the file. For assets, such as purchased content that are already stored remotely at a service such as iTunes® or Amazon Cloud®, metadata about the content can include a Universal Resource Locator (URL) that points to where the content is located. File system metadata can be generated by the file system of each client device 100. Synchronization metadata can include a universally unique identifier (UUID) for a file or a directory that is unique across the client devices 100 of a user, and can further include ETAGS. ETAGS can specify a specific version of the metadata for a document or a directory. ETAGS can be generated by the synchronization system 1000 to manage the user data sets and resolve conflicts between differing generations of user data for a particular user data set. For example, an ETAG can be used to distinguish different generations of a word processing document of the resumé of the user.

Figure 11:
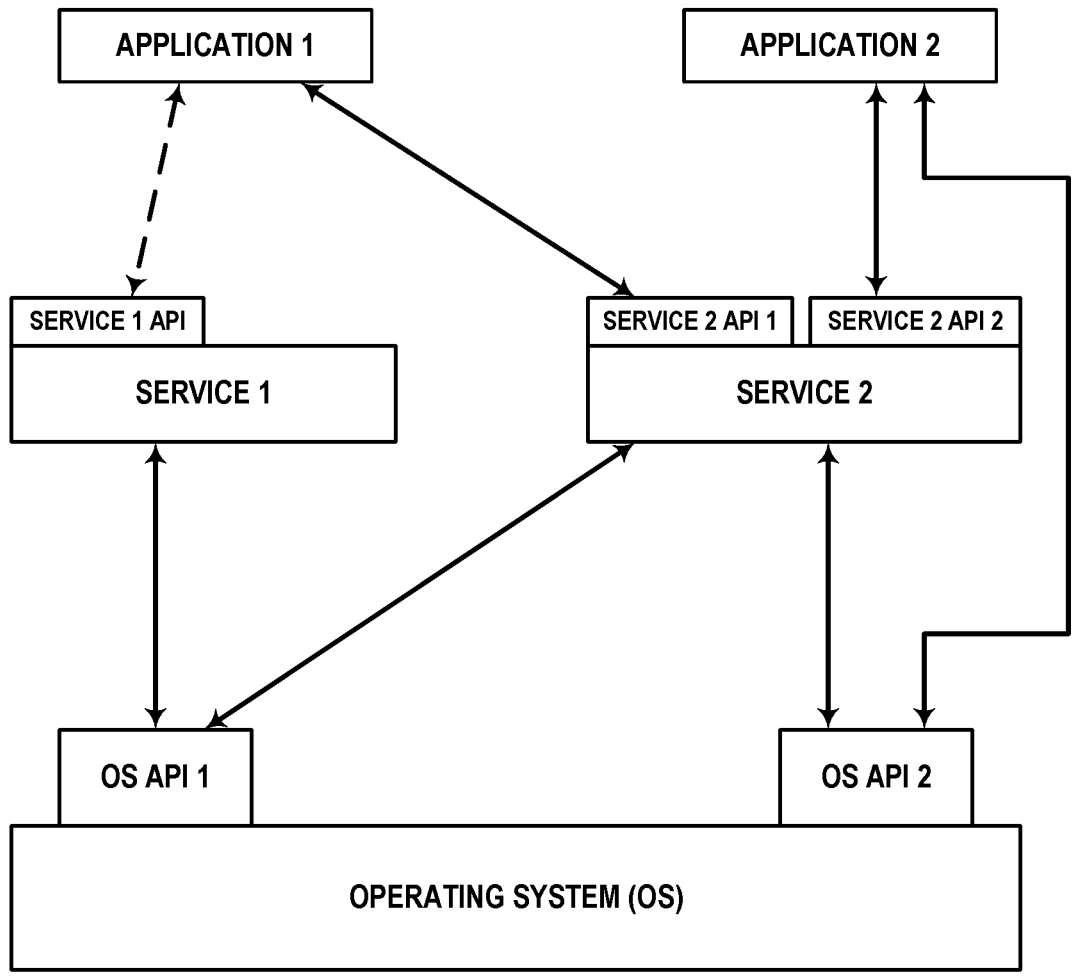
FIG. 11 illustrates an exemplary embodiment of a software stack usable in some embodiments of the invention.

In FIG. 11 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (winch can be, for example, a software library) makes calls to and receives returned values from both as API 1 and OS API 2, Application 2 makes calls to and receives returned values from as API 2.

Figure 12:
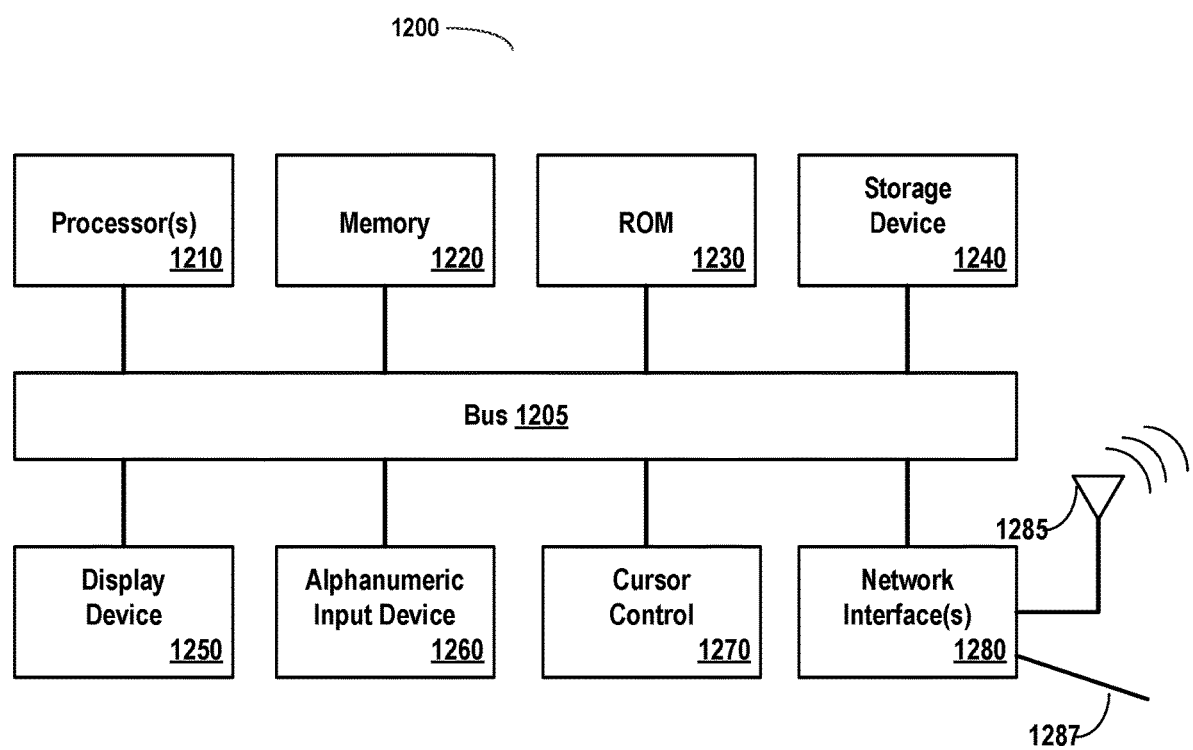
FIG. 12 is a block diagram of one embodiment of a computing system.

FIG. 12 is a block diagram of one embodiment of a computing system 1200. The computing system illustrated in FIG. 12 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 12 may be used to provide the computing device and/or the server device.

Computing system 1200 includes bus 1205 or other communication device to communicate information, and processor 1210 coupled to bus 1205 that may process information.

While computing system 1200 is illustrated with a single processor, computing system 1200 may include multiple processors and/or co-processors 1210. Computing system 1200 further may include random access memory (RAM) or other dynamic storage device 1220 (referred to as main memory), coupled to bus 1205 and may store information and instructions that may be executed by processor(s) 1210. Main memory 1220 may also be used to store temporary variables or other intermediate information during execution of instructions by processor 1210.

Computing system 1200 may also include read only memory (ROM) and/or other static storage device 1240 coupled to bus 1205 that may store static information and instructions for processor(s) 1210. Data storage device 1240 may be coupled to bus 1205 to store information and instructions. Data storage device 1240 such as flash memory or a magnetic disk or optical disc and corresponding drive may be coupled to computing system 1200.

Computing system 1200 may also be coupled via bus 1205 to display device 1250, such as a cathode ray tube (CRT) or liquid crystal display (LCD), to display information to a user. Computing system 1200 can also include an alphanumeric input device 1260, including alphanumeric and other keys, which may be coupled to bus 1205 to communicate information and command selections to processor(s) 1210. Another type of user input device is cursor control 1270, such as a touchpad, a mouse, a trackball, or cursor direction keys to communicate direction information and command selections to processor(s) 1210 and to control cursor movement on display 1250. Computing system 1200 may also receive user input from a remote device that is communicatively coupled to computing system 1200 via one or more network interfaces 1280.

Computing system 1200 further may include one or more network interface(s) 1280 to provide access to a network, such as a local area network. Network interface(s) 1280 may include, for example, a wireless network interface having antenna 1285, which may represent one or more antenna(e). Computing system 1200 can include multiple wireless network interfaces such as a combination of WiFi, Bluetooth® and cellular telephony interfaces. Network interface(s) 1280 may also include, for example, a wired network interface to communicate with remote devices via network cable 1287, which may be, for example, an Ethernet cable, a coaxial cable, a fiber optic cable, a serial cable, or a parallel cable.

In one embodiment, network interface(s) 1280 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1280 may provide wireless communications using, for example. Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A non-transitory computer readable medium programmed with instructions that, when executed by a processing system, perform a method to synchronize data for a first user account on a multi-user device, comprising:
   receiving an indication to log out a first user from a first user account of a multiuser device, wherein the multi-user device hosts a plurality of user accounts;
   identifying data associated with the first user account to be synchronized with a remote storage;
   tearing down the user space for the first user account;
   rebooting the multi-user device, as a system user, to the login screen of the system user, including generating one or more processes associated with the system user;
   detecting a login for a second user account of the multi-user device; and
   synchronizing a first part of the data associated with the first user account with a remote storage after the first user has logged out and while the second user account is executing.

2. The non-transitory computer readable medium of claim 1, wherein the synchronization of the data is performed in at least one background process, and wherein a kernel process of the multi-user device continues running after the first user logs out and when the second user logs in.

3. The non-transitory computer readable medium of claim 2, wherein work of the second user account is performed in at least one foreground process.

4. The non-transitory computer readable medium of claim 1, wherein the indication for the log out is generated in response to the first user logging out of the multi-user device, and wherein the multi-user device is used by multiple different users each serially logging on using the multi-user device, then logging off.

5. The non-transitory computer readable medium of claim 1, wherein the indication for the log out is generated in response to a command to logout user accounts from a plurality of devices and the multi-user device is one of the plurality of devices.

6. The non-transitory computer readable medium of claim 5, wherein each of the plurality of devices is part of a classroom session.

7. The non-transitory computer readable medium of claim 1, further comprising:
   rebooting the multi-user device into a user space of the second user account.

8. The non-transitory computer readable medium of claim 1, wherein receiving the indication to log out a first user from a first user account comprises:
   registering the multi-user device for a switch user event, wherein the multi-user device is executing for the first user account; and detecting a switch user event.

9. The non-transitory computer readable medium of claim 1, further comprising:
   synchronizing a second part of the data associated with the first user account prior to tearing down the user space for the first user account.

10. The non-transitory computer readable medium of claim 1, wherein the multi-user device presents a user interface for the currently executing user account.

11. A method to synchronize data for a first user account on a multi-user device, comprising:
    receiving an indication to log out a first user from a first user account of a multiuser device, wherein the multi-user device hosts a plurality of user accounts;
    identifying data associated with the first user account to be synchronized with a remote storage;
    tearing down the user space for the first user account;
    rebooting the multi-user device, as a system user, to the login screen of the system user, including generating one or more user processes associated with the system user;
    detecting a login for a second user account of the multi-user device; and
    synchronizing a first part of the data associated with the first user account with a remote storage after the first user has logged out and while the second user account is executing.

12. The method of claim 11, wherein the synchronization of the data is performed in at least one background process, and wherein a kernel process of the multi-user device continues running after the first user logs out and when the second user logs in.

13. The method of claim 12, wherein work of the second user account is performed in at least one foreground process.

14. The method of claim 11, wherein the indication for the log out is generated in response to the first user logging out of the multi-user device, and wherein the multi-user device is used by multiple different users each serially logging on, using the multi-user device, then logging off.

15. The method of claim 11, wherein the indication for the log out is generated in response to a command to logout user accounts from a plurality of devices and the multi-user device is one of the plurality of devices.

16. The method of claim 15, wherein each of the plurality of devices is part of a classroom session.

17. The method of claim 11, further comprising:
rebooting the multi-user device into a user space of the second user account.

18. The method of claim 11, wherein receiving the indication to log out a first user from a first user account comprises:
registering the multi-user device for a switch user event, wherein the multi-user device is executing for the first user account; and detecting a switch user event.

19. The method of claim 11, further comprising:
synchronizing a second part of the data associated with the first user account prior to tearing down the user space for the first user account.

20. The method of claim 11, wherein the multi-user device presents a user interface for the currently executing user account.

* * * * *

UNITED STATES PATENT AND TRADEMARK OFFICE
CERTIFICATE OF CORRECTION

PATENT NO. : 10,970,083 B2  
APPLICATION NO. : 16/259730  
DATED : April 6, 2021  
INVENTOR(S) : Jonathan E. Drummond et al.

It is certified that error appears in the above-identified patent and that said Letters Patent is hereby corrected as shown below:

In the Claims

Column 19  
Line 53, delete "the user space" and substitute --a user space--.

Column 19  
Lines 54-55, delete "the login screen" and substitute --a login screen--.

Column 20  
Line 43, delete "the user space" and substitute --a user space--.

Column 20  
Lines 44-45, delete "the login screen" and substitute --a login screen--.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*